US010310181B2

(12) United States Patent
Wessels et al.

(10) Patent No.: US 10,310,181 B2
(45) Date of Patent: Jun. 4, 2019

(54) $\chi^{(2)}$ MODULATORS AND RELATED DEVICES WITH BARIUM TITANATE PHOTONIC CRYSTAL WAVEGUIDES

(71) Applicant: Northwestern University, Evanston, IL (US)

(72) Inventors: Bruce W. Wessels, Wilmette, IL (US); Zhifu Liu, Wilmette, IL (US); Peter D. Girouard, Wrentham, MA (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 0 days.

(21) Appl. No.: 15/731,097

(22) Filed: Apr. 17, 2017

(65) Prior Publication Data

US 2017/0299811 A1 Oct. 19, 2017

Related U.S. Application Data

(60) Provisional application No. 62/323,185, filed on Apr. 15, 2016.

(51) Int. Cl.
| | |
|---|---|
| *G02F 1/035* | (2006.01) |
| *G02B 6/122* | (2006.01) |
| *G02B 6/12* | (2006.01) |
| *G02B 6/293* | (2006.01) |
| *G02F 1/065* | (2006.01) |
| *G02F 1/225* | (2006.01) |

(52) U.S. Cl.
CPC ....... *G02B 6/1225* (2013.01); *G02B 6/12007* (2013.01); *G02B 6/29352* (2013.01); *G02F 1/035* (2013.01); *G02F 1/065* (2013.01); *G02F 1/2257* (2013.01)

(58) Field of Classification Search
USPC ........................................................ 385/1–3
See application file for complete search history.

(56) References Cited

U.S. PATENT DOCUMENTS

| | | | |
|---|---|---|---|
| 6,118,571 A | | 9/2000 | Wessels et al. |
| 7,224,878 B1 | | 5/2007 | Wessels et al. |
| 8,571,373 B2 | | 10/2013 | Wang et al. |
| 9,494,734 B1 | * | 11/2016 | Jain ................... G02F 1/01708 |
| 2005/0002605 A1 | * | 1/2005 | Sakai ..................... B82Y 20/00 385/27 |
| 2006/0034577 A1 | * | 2/2006 | Furuya .................. B82Y 20/00 385/129 |
| 2008/0019648 A1 | * | 1/2008 | Atwater ................... G02F 1/03 385/122 |
| 2008/0050082 A1 | | 2/2008 | Mitomi et al. |
| 2010/0316342 A1 | * | 12/2010 | Casey ............. B29D 11/00663 385/129 |

(Continued)

OTHER PUBLICATIONS

Abel, S. et al., "A strong electro-optically active lead-free ferroelectric integrated on silicon", Nature Communications, 4 (2013), 1671.

(Continued)

*Primary Examiner* — Eric Wong
(74) *Attorney, Agent, or Firm* — Locke Lord LLP; Tim Tingkang Xia, Esq.

(57) ABSTRACT

Barium titanate thin film waveguides and related modulator and devices with photonic crystal structures to promote wide bandwidths, low operating voltages and small footprint.

13 Claims, 20 Drawing Sheets

(56) References Cited

U.S. PATENT DOCUMENTS

Figure 1A:
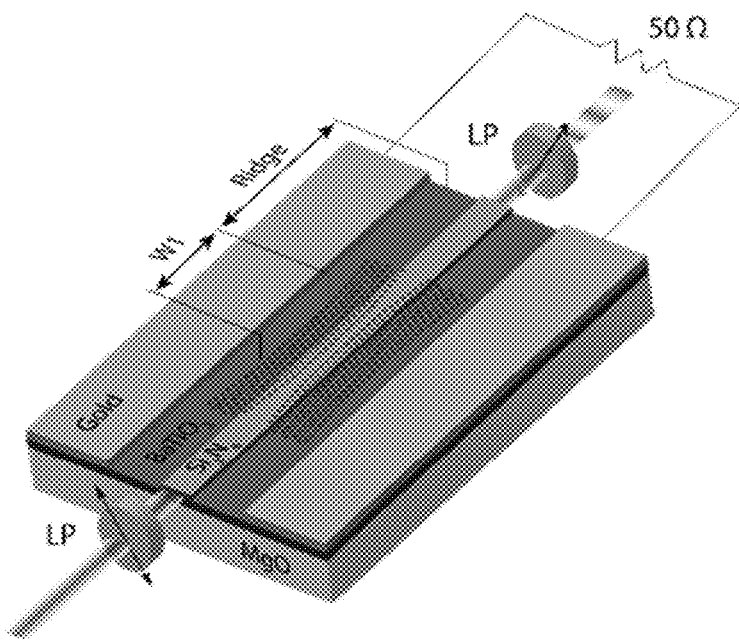
Figure 1B:
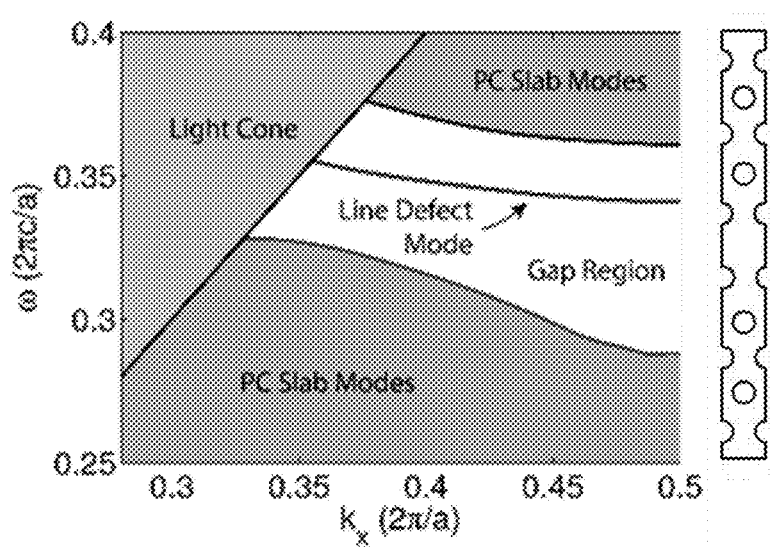
Figure 1C:
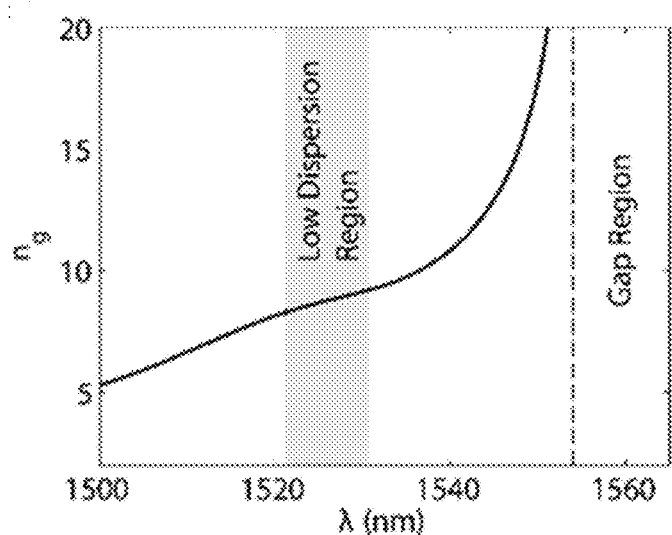

2013/0330247 A1* 12/2013 Wilson ............. B01L 3/502707
422/504

OTHER PUBLICATIONS

Petraru, A. et al., "Ferroelectric BaTiO3 thin-film optical waveguide modulators", Applied Physics Letters, 81 (2002), 1375-1377.

Li, J. et al., "Photonic Crystal Waveguide Electro-Optic Modulator with a Wide Bandwith", Journal of Lightwave Technology, 31 (2013), 1607-1607.

Xiong, C. et al., "Active Silicon integrated nanophotonics: ferroelectric BaTiO3 devices", Nano Letters 14, 3 (2014), 1419-1425.

Haxha, S. et al., "Bandwidth estimation for ultra-high-speed lithium niobate modulators," Appl. Opt. 42, 2674-2682 (2003).

Soljacic, M. et al., "Photonic-crystal slow-light enhancement of nonlinear phase sensitivity," J. Opt. Soc. Am. B 19, 2052-2059 (2002).

Shi, Y. et al, "High-Speed Electrooptic Modulator Characterization Using Optical Spectrum Analysis," J. Lightwave Technol. 21, 2358 (2003).

Fallahkhair, A. et al., "Vector finite difference modesolver for anisotropic dielectric waveguides," J. Lightwave Technol. 26, 1423-1431 (2008).

Niu, F. et al., "Epitaxial growth and strain relaxation of BaTiO3 thin films on SrTiO3 buffered (001) Si by molecular beam epitaxy", J. Vac. Sci. Technol. B 25, 1053-1057 (2007).

Chen, E. et al., "Characteristics of Coplanar Transmission Lines on Multilayer Substrates: Modeling and Experiments", IEEE Transactions on Microwave Theory and Techniques, vol. 45, No. 6, Jun. 1997.

Tang et al., "Electrooptic Modulation Up to 40 GHz in a Barium Titanate Thin Film Waveguide Modulator", Optics Express Nov. 29, 2004, vol. 12, No. 24, 5962-5967.

International Search Report and Written Opinion for PCT/US2017/000026 dated Jul. 25, 2017, 13 pages.

* cited by examiner

$\chi^{(2)}$ MODULATORS AND RELATED DEVICES WITH BARIUM TITANATE PHOTONIC CRYSTAL WAVEGUIDES This invention claims priority to and the benefit of application Ser. No. 62/323,185 filed Apr. 15, 2016—the entirety of which is incorporated herein by reference.

STATEMENT OF FEDERALLY-SPONSORED RESEARCH

This invention was made with government support under IIP-1500222, DMR-1121262, and ECCS-1201853 awarded by the National Science Foundation (NSF). The government has certain rights in the invention.

BACKGROUND OF THE INVENTION

A major challenge posed by the exponentially increasing demands for data transfer is the realization of compact EO modulators with wide EO bandwidths, low operating voltage, large extinction, and a small footprint. High-speed and low-power devices are especially important in short-reach networks where the replacement of copper with optical interconnects is sought at shorter and shorter length scales. At the same time, greater component density is also required in longer distance networks.

The distinct requirements for long-haul and short-reach networks have resulted in different material platforms and modulation mechanisms investigated for each. Lithium niobate has been well-established as the standard material used for modulators in long-distance communications for decades. These devices, however, are centimeters long, preventing the use of $LiNbO_3$ in shorter-reach networks that require higher density. Silicon free-carrier modulators have received great interest as candidates for short-reach networks due to the potential for integrating both driver electronics and photonic elements into a single CMOS-compatible platform. It remains a major challenge, however, to achieve simultaneously large bandwidths, low voltages, and large extinction in a single device architecture with a sub-millimeter device length.

Enhancement of optoelectronic device performance for both the $LiNbO_3$ and silicon platforms has been demonstrated utilizing photonic crystal (PC) slow light structures. In $LiNbO_3$, the tunability of the PC band edge has been investigated as a modulation mechanism. A major challenge for these devices is weak overlap between the PC structure and optical mode of the $LiNbO_3$ waveguide, which has since been addressed by using smart cut $LiNbO_3$ films. High speed PC modulators using $LiNbO_3$, however, have not yet been demonstrated. Silicon free-carrier modulators with dispersion-engineered line defect PC waveguides have been demonstrated with a reduced driving voltage and device length resulting from an enhancement in the phase delay proportional to the optical group index. Silicon PC modulators have been reported with 40 Gbps bit rates comparable to those achieved in the highest performing rib waveguide silicon modulators with an order of magnitude smaller footprint, demonstrating the effect of slow light in reducing the required modulator size. Silicon modulators, however, still suffer from low extinction, which limits reach. Compared with the approaches taken thus far on $LiNbO_3$, the dispersion-engineered line defect waveguides on silicon offer the advantage of wideband optical operation for wavelength division multiplexing applications. Dispersion-engineered slot photonic crystal waveguides have been further used to enhance the EO coefficient of EO polymers, showing promise for using such an approach to reduce the voltage of $\chi^{(2)}$ modulators.

SUMMARY OF THE INVENTION

In light of the foregoing, it is an object of the present invention to provide electro-optic waveguides, related modulator device configurations and/or method(s) for their use, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It is another object of this invention to fabricate ferroelectric thin film waveguide through standard $Si_3N_4$ fabrication technologies which may be employed in a manner compatible with standard CMOS processing technologies.

It is an object of this invention to provide a photonic crystal waveguide configuration obtainable using available fabrication techniques without compromising $BaTiO_3$ thin film properties.

It is a further object of this invention to provide photonic crystal thin film waveguide electro-optic modulators that exhibit low drive voltage, high bandwidth and compact size for photo integrated circuits.

Other objects, features, benefits and advantages of the present invention will be apparent from this summary and the following descriptions of certain embodiments, and will be readily apparent to those skilled in the art having knowledge of various waveguide modulator devices, configurations and related fabrication techniques. Such objects, features, benefits and advantages will be apparent from the above as taken into conjunction with the accompanying examples, data, figures and all reasonable inferences to be drawn therefrom.

In part, the present invention can relate to thin-film photonic crystal electro-optic waveguide modulator devices. Such a device can comprise a waveguide comprising a substrate, a nano-dimensioned film component comprising $BaTiO_3$ on or coupled to the substrate, and a ridge component on or coupled to the film component. The film and ridge components can comprise an electro-optic medium and an array of spaced lines of holes therein, such an array defining an absent line of holes in the direction of light propogation through the medium and two tapered regions at opposite ends of the defined absent line comprising lines of holes positionally shifted and a constant nanometric distance from an adjacent line of holes, whereby such an array can provide such a waveguide a photonic crystal structure.

In certain embodiments, such a ridge component can have a refractive index less than the refractive index of the film component. In certain such embodiments, the ridge component can comprise $Si_3N_4$, or other suitable materials known to those skilled in the art. Such a device can be configured with a length dimension up to about 2 mm. Regardless of dimension, such a waveguide can comprise two opposed, substantially coplanar electrodes, each electrode on an opposed side of the ridge component, such that the waveguide can be used in a range of applications, including but not limited to integration or incorporation into a photonic integrated circuit.

BRIEF DESCRIPTIONS OF THE DRAWINGS

FIGS. 1A-E. $BaTiO_3$ photonic crystal modulator. A, Schematic of the photonic crystal modulator operated between crossed linear polarizers for intensity modulation. B, Calculated band structure for a hole radius to lattice parameter ratio of 0.28. Shown at the right is the unit cell used in the simulation. C, Group index of the line defect mode calculated from the band diagram (B). D, False-colored scanning electron microscope (SEM) image of the fabricated modulator with a magnified inset view of the tapered region. E, Cross-sectional SEM image of the fabricated structure, showing a conical profile of the milled holes.

FIGS. 2A-D. Frequency response and electro-optic coefficient enhancement. A, Measured sideband response of the photonic crystal modulator for modulation frequencies between 10 and 40 GHz at an optical wavelength of 1530 nm. B, Measured and simulated electro-optic frequency response of the modulator. The response is simulated for a 1 and 100 μm long modulators and the latter for the case where the impedance is matched in the 20-50 GHz region. C, Frequency-dependent electro-optic coefficient calculated using the measurements in A and B. D, Frequency dependent enhancement factor for the total interaction region calculated from the data in C.

Figure 3A:
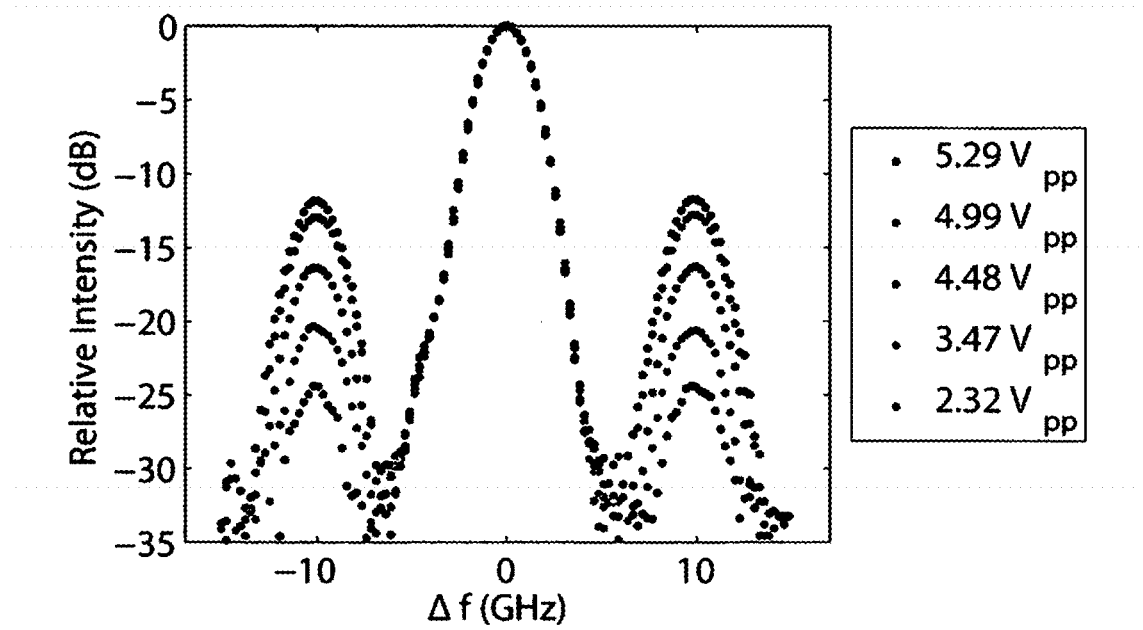
Figure 3B:
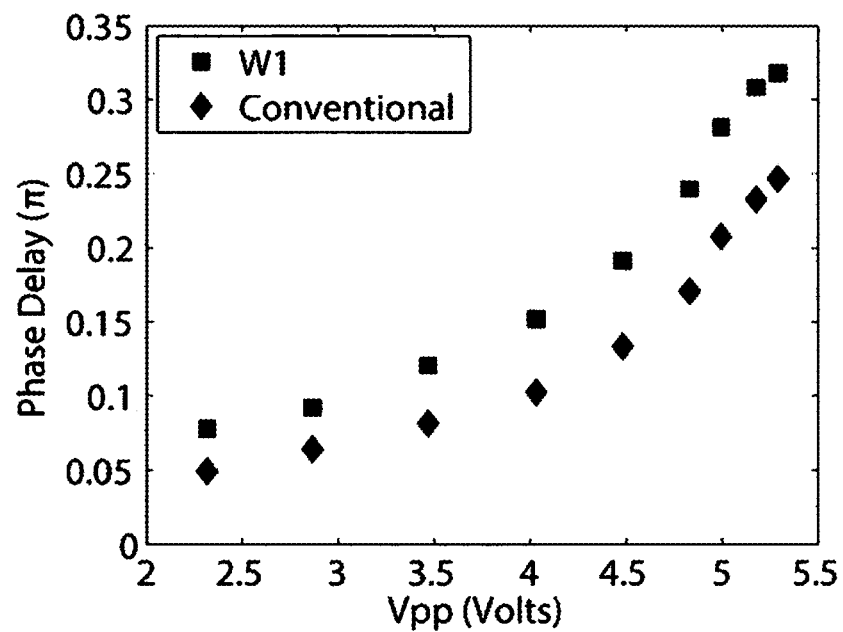

FIGS. 3A-B. Amplitude response. A, Measured electro-optic sideband response as a function of applied voltage. B, Phase delay versus voltage calculated from the data in A.

Figure 4A:
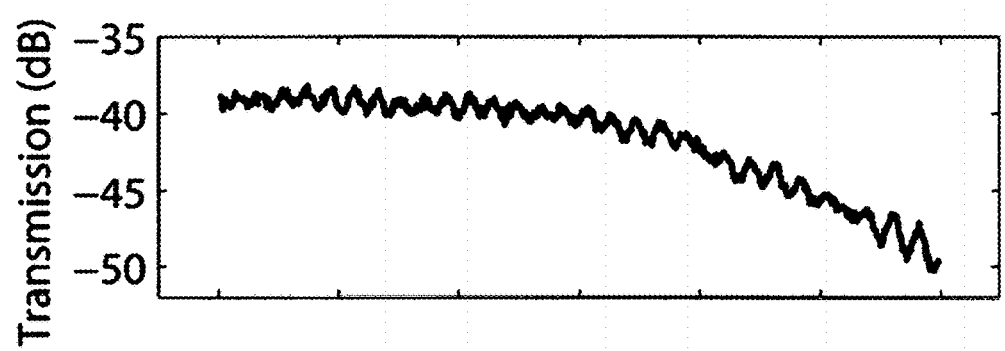
Figure 4B:
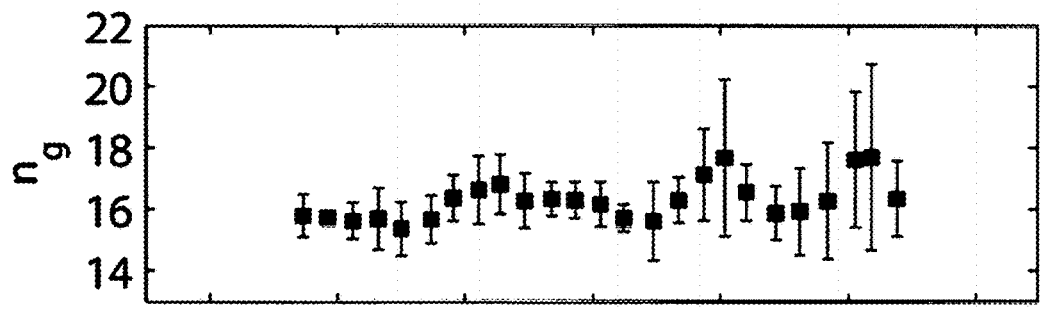
Figure 4C:
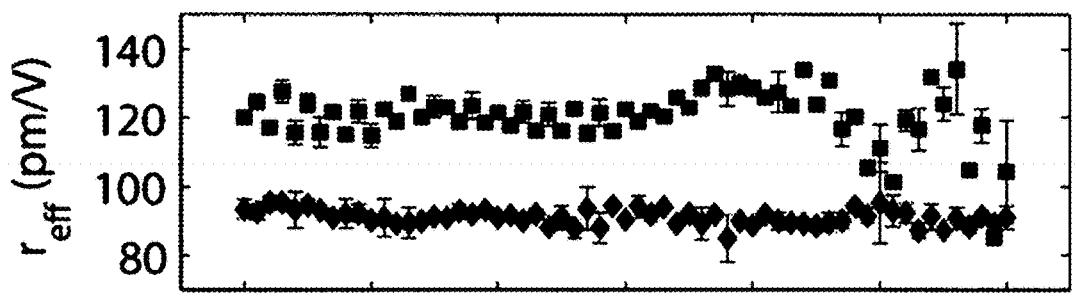
Figure 4D:
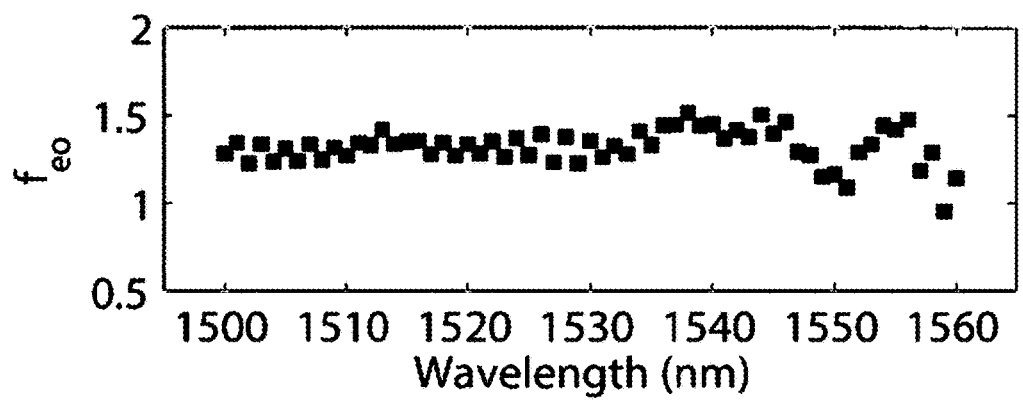

FIGS. 4A-D. A, Measured transmission versus optical wavelength. B, Group index calculated from the fringes measured in the transmission. C, Measured wavelength-dependent EO coefficient. D, Wavelength-dependent enhancement factor calculated from C. (Each of FIGS. 4A-D is plotted with reference to wavelengths of 15000-1560 nm, as shown in FIG. 4D.)

Figure 5:
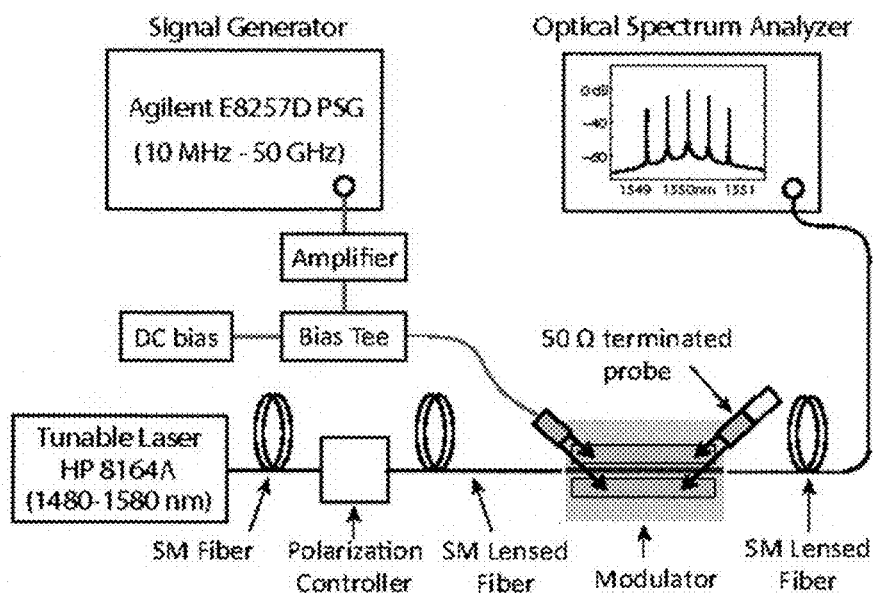

FIG. 5. Optical spectral analysis setup used for measurements of the electro-optic properties at frequencies between 10 and 40 GHz.

Figure 6:
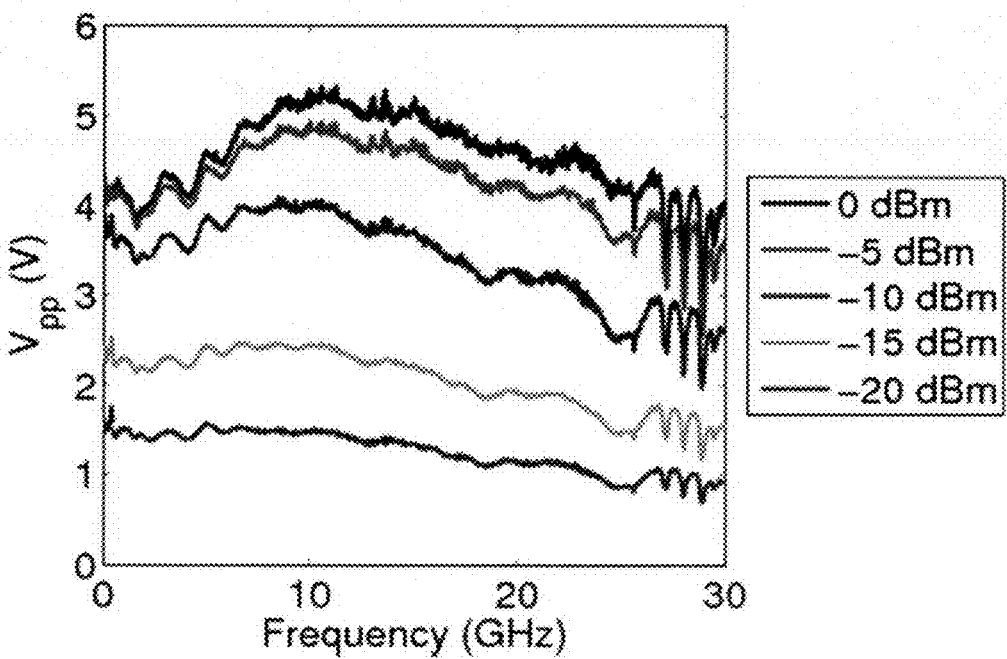

FIG. 6. Measured output voltage from the amplifier that is supplied to the device for different input powers.

Figure 7A:
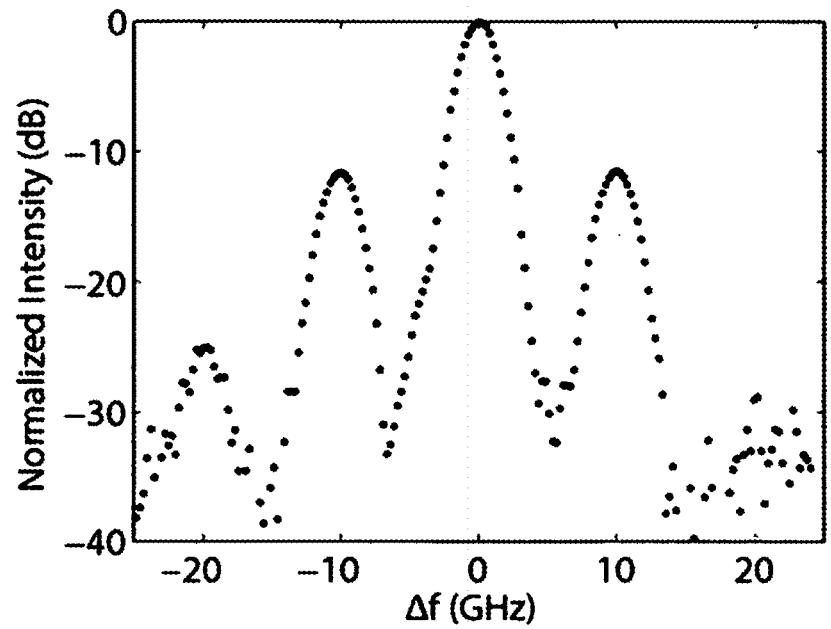
Figure 7B:
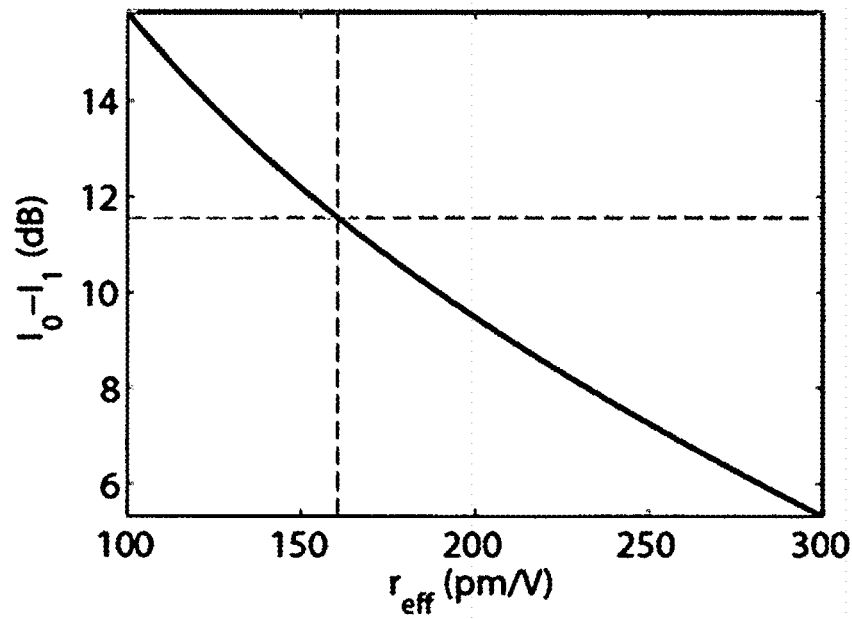

FIGS. 7A-B. A, Measured optical sideband response for 10 GHz modulation at 1530 nm. B, Graphical calculation of the electro-optic coefficient from the measured difference in height between the first and zeroth order peaks and the theoretical dependence on the electro-optic coefficient.

Figure 8:
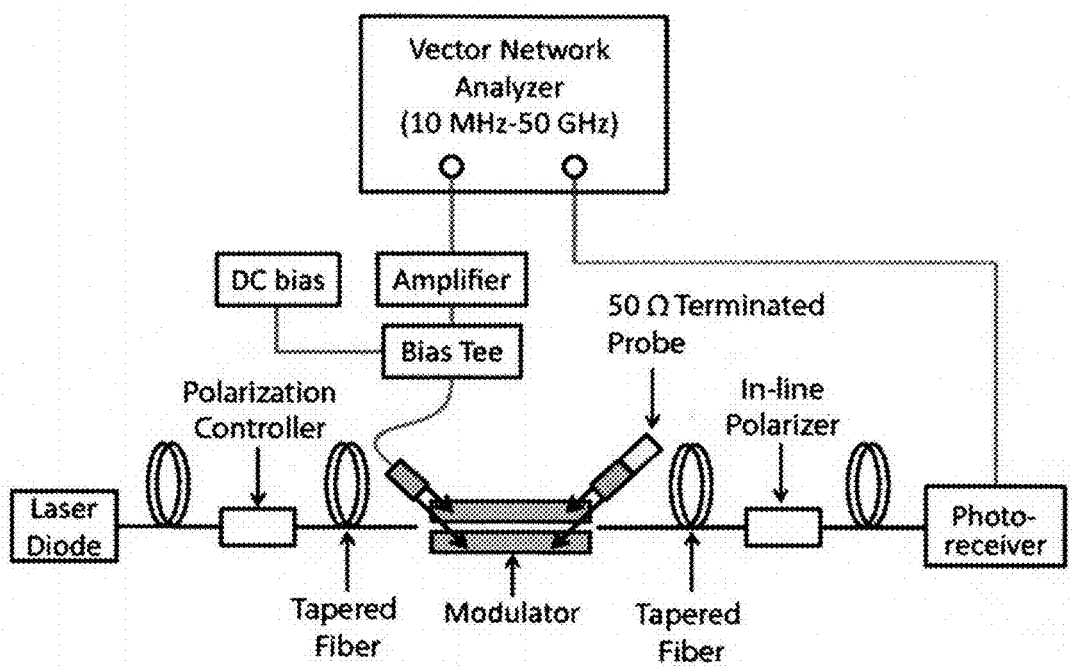

FIG. 8. Schematic of the setup used for measuring the frequency-dependent electro-optic response.

Figure 9A:
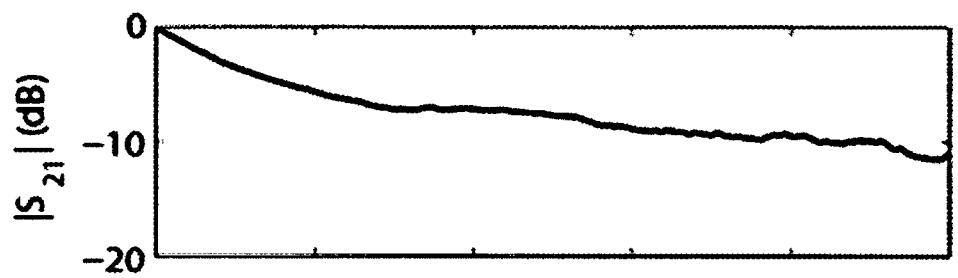
Figure 9B:
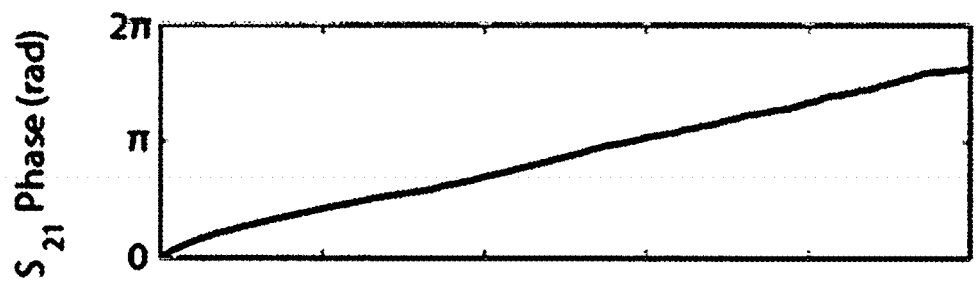
Figure 9C:
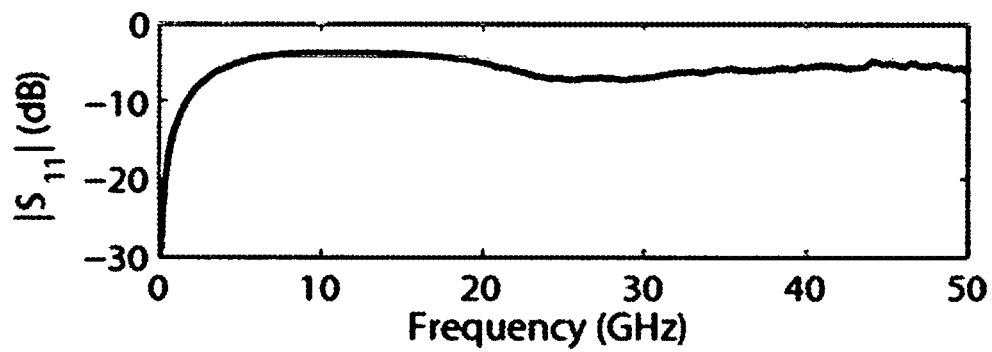

FIGS. 9A-C. Measured magnitude (A) and phase (B) of the transmission ($S_{21}$) coefficient. C, Measured reflection coefficient ($S_{11}$) magnitude.

Figure 10:
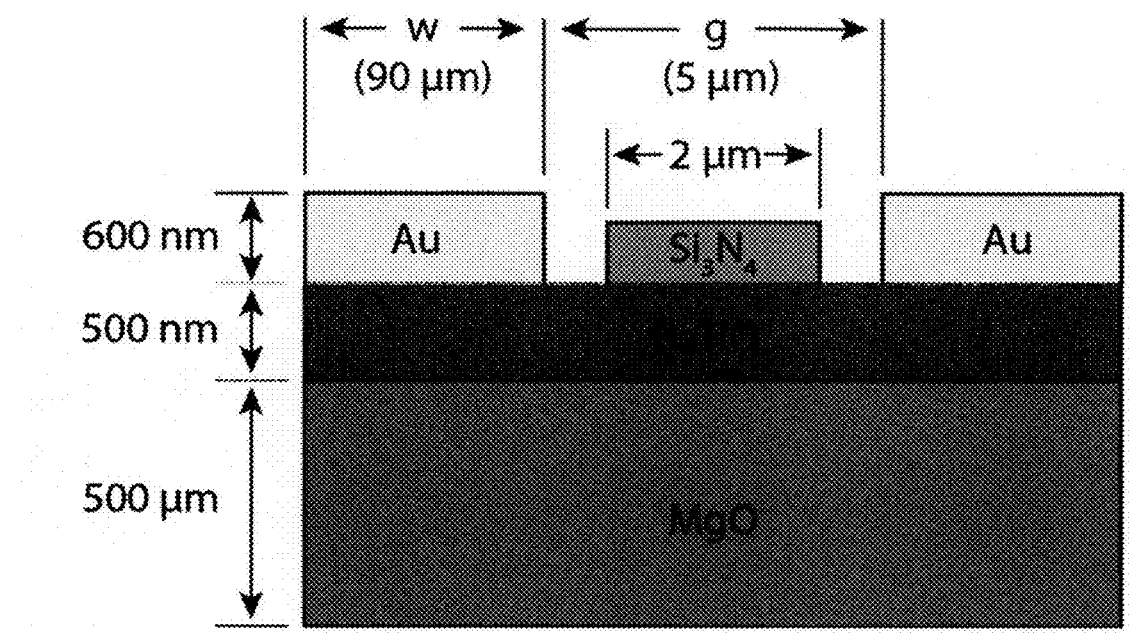

FIG. 10. Schematic of the device cross-section excluding the photonic crystal.

Figure 11A:
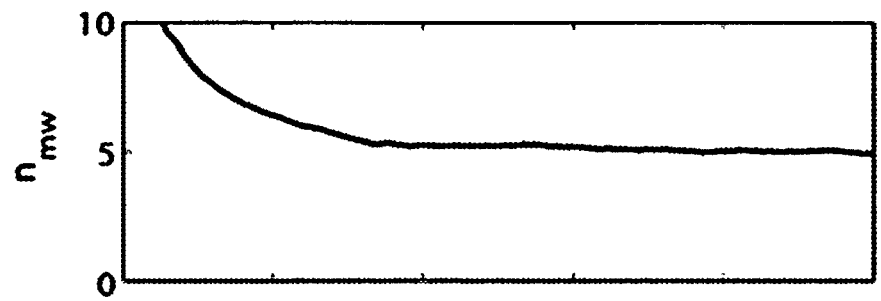
Figure 11B:
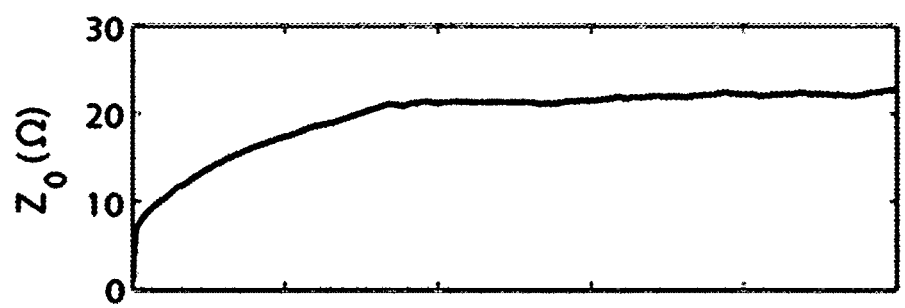
Figure 11C:
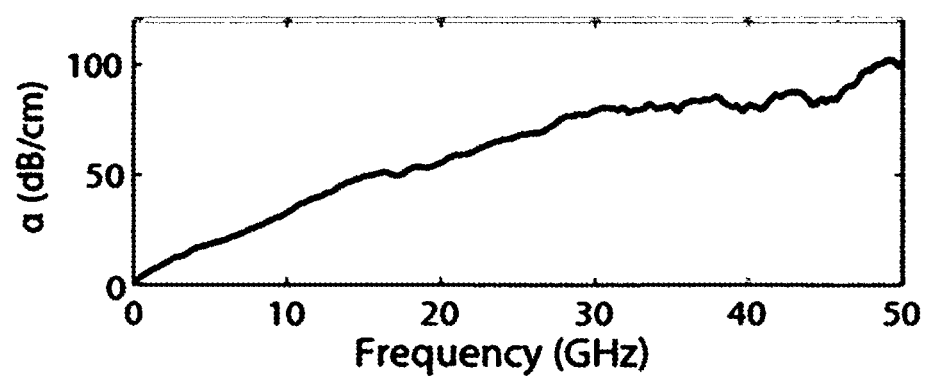

FIGS. 11A-C. Measured microwave effective index (A), characteristic impedance (B), and total attenuation loss (C).

Figure 12A:
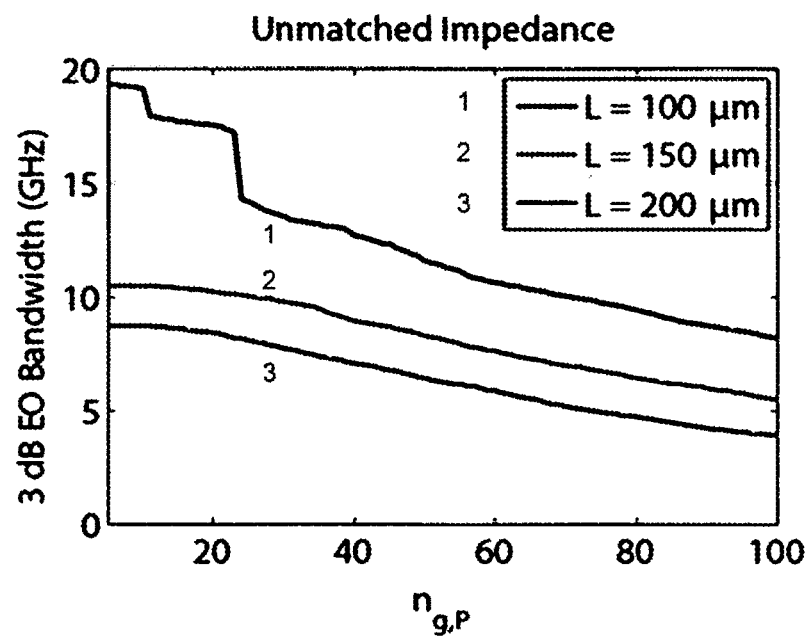
Figure 12B:
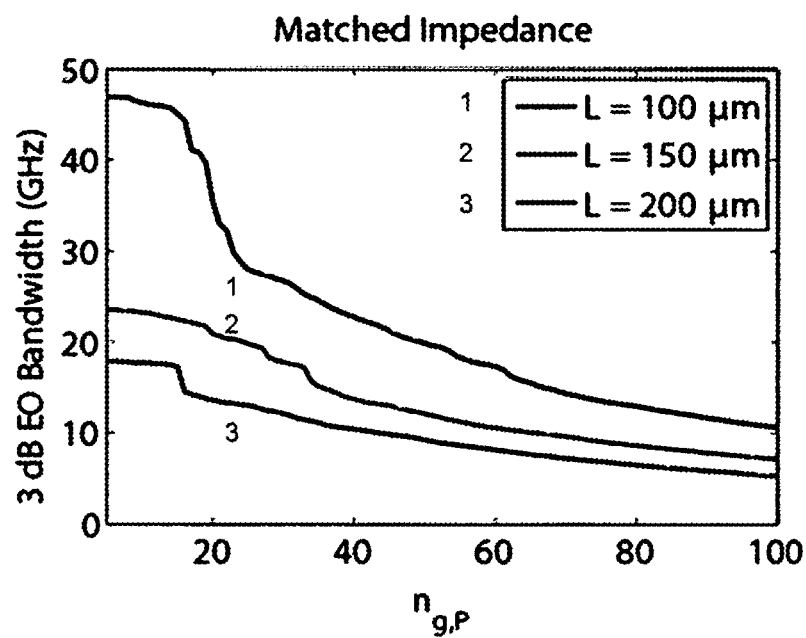

FIGS. 12A-B. Calculated 3 dB electro-optic bandwidth for photonic crystal modulators with total lengths of 100, 150, and 200 with optical group indices between 5 and 100. A, For the case where the impedance is given by FIG. 11B. B, For the case where the impedance in the range 20-50 GHz is matched to 50.

Figure 13A:
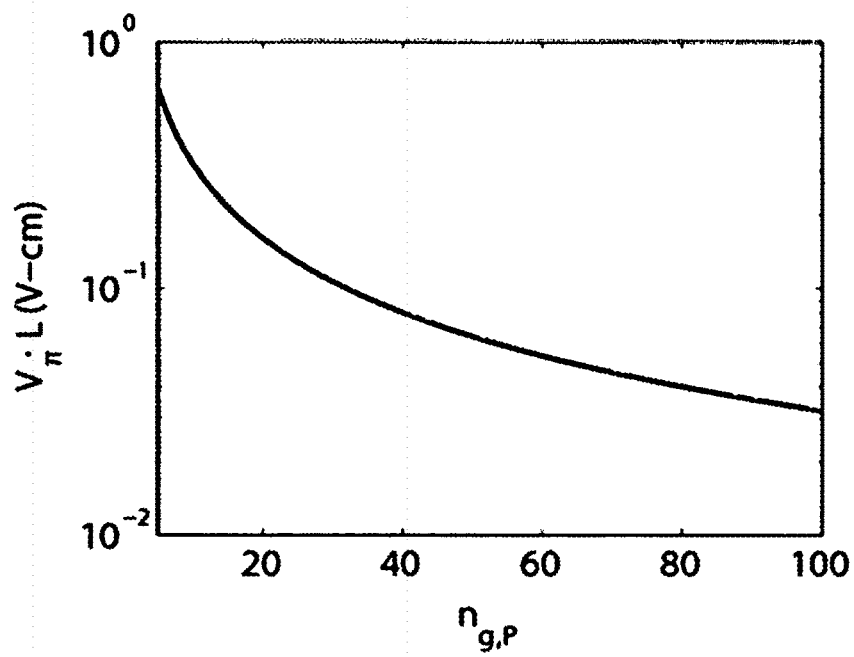
Figure 13B:
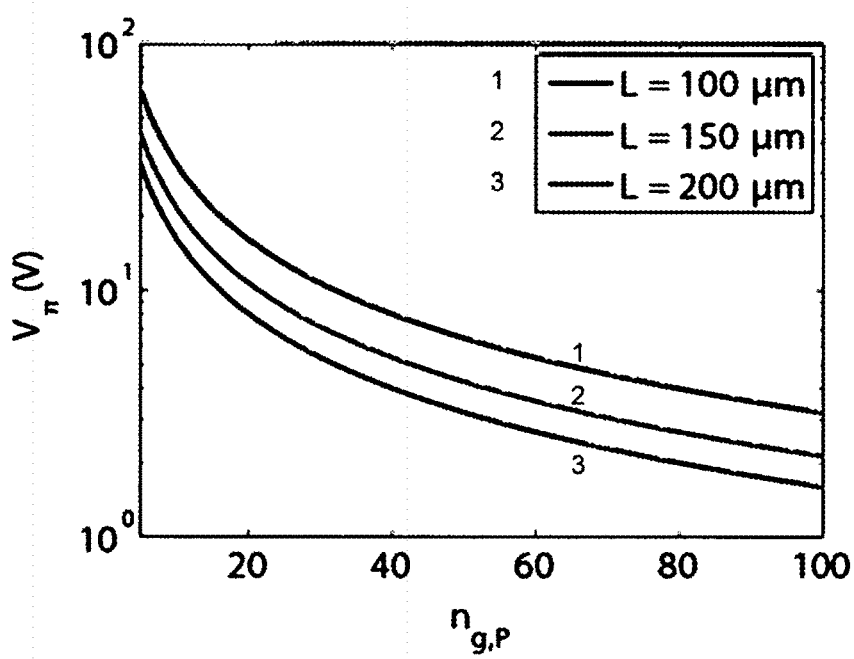

FIGS. 13A-B. Calculated voltage-length product (A) and half wave voltage (B) versus optical group index for photonic crystal modulators with lengths of 100, 150, and 200.

Figure 14:
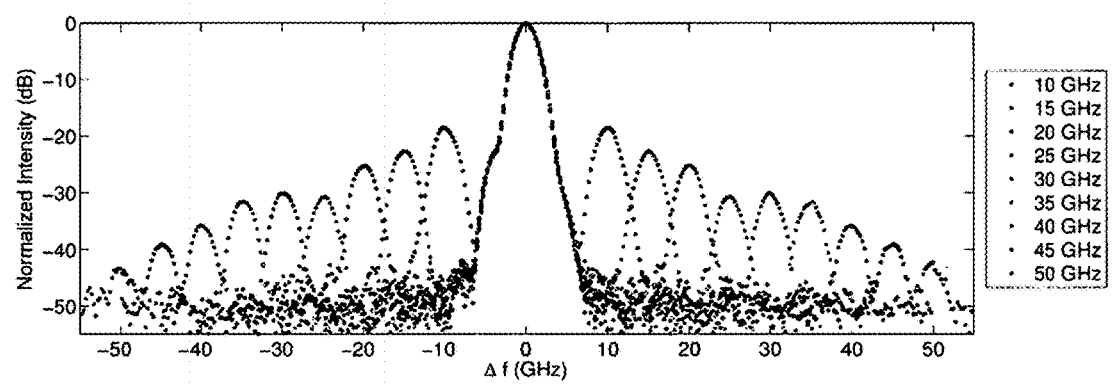

FIG. 14. Measured phase modulated sideband response for modulation frequencies between 10 and 50 GHz.

Figure 15A:
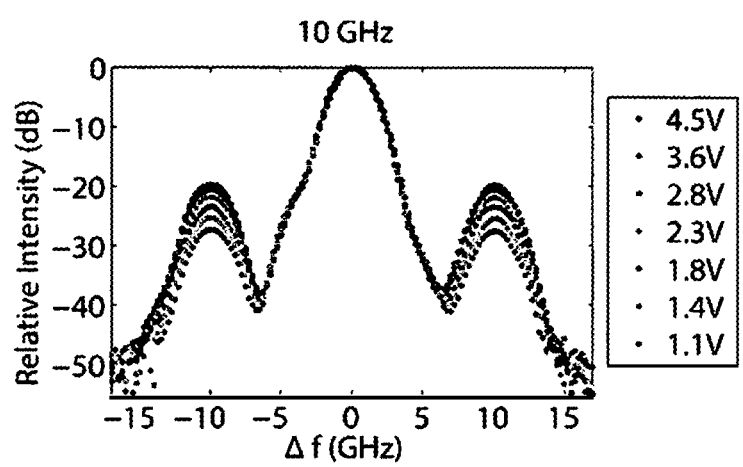
Figure 15B:
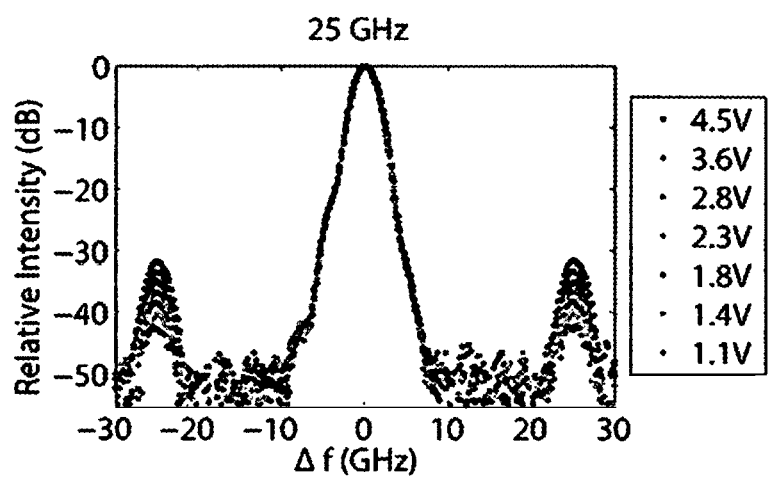
Figure 15C:
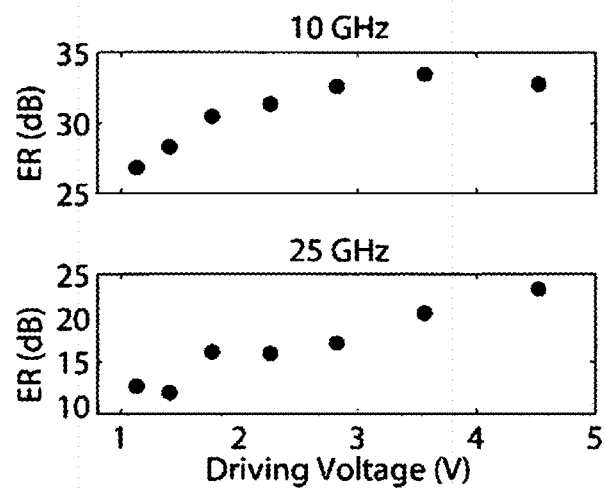

FIGS. 15A-C. Measured sideband spectral response for driving amplitudes between 1.1 and 4.5 V at frequencies of 10 GHz (A) and 25 GHz (B) with corresponding measured ER versus voltage (C).

Figure 16:
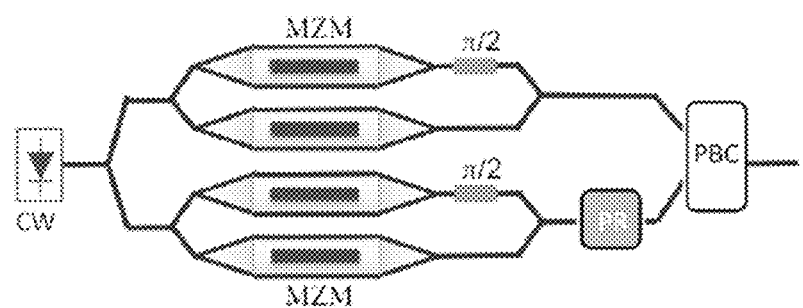

FIG. 16 is a schematic representation of a photonic integrated circuit (PIC) comprising multiple Mach-Zehnder (MZ) modulators for a coherent optical transmitter, in accordance with certain nonlimiting embodiments of this invention.

DETAILED DESCRIPTION OF CERTAIN EMBODIMENTS

Certain non-limiting embodiments of this invention demonstrate the first high bandwidth $\chi^{(2)}$ dispersion-engineered PC modulator using thin film $BaTiO_3$. In comparison with Si and InP electro-absorption modulators, $\chi^{(2)}$ modulators have an intrinsically wide optical bandwidth operation and a greatly simplified structure. $BaTiO_3$ thin films have measured in-device effective EO coefficients that are more than 10 times larger than those of $LiNbO_3$, enabling much smaller footprint and lower-voltage devices. Such $BaTiO_3$ modulators can have a 0.39 V-cm voltage-length product which is nearly a factor of 2 smaller than the best reported for silicon. Use of an epitaxial thin film ferroelectric offers the advantages of strong overlap between the PC structure and optical waveguide mode and lower microwave losses enabling higher EO bandwidths. More specifically, the present invention provides a line defect PC $BaTiO_3$ modulator at technologically relevant microwave frequencies of 10-40 GHz using optical spectrum analysis to measure the EO coefficient and its enhancement. An EO coefficient of 107 pm/V and enhancement factor of 1.4 is measured at 30 GHz. Wideband optical operation in the C band (1530-1565 nm) is demonstrated with an effective in-device electro-optic coefficient between 114 and 134 pm/V. From measured microwave properties of the device, simulation indicates that devices with greater than 40 GHz EO 3 dB bandwidth and 0.16 V-cm voltage-length product are achievable in sub-millimeter long devices.

Figure 1D:
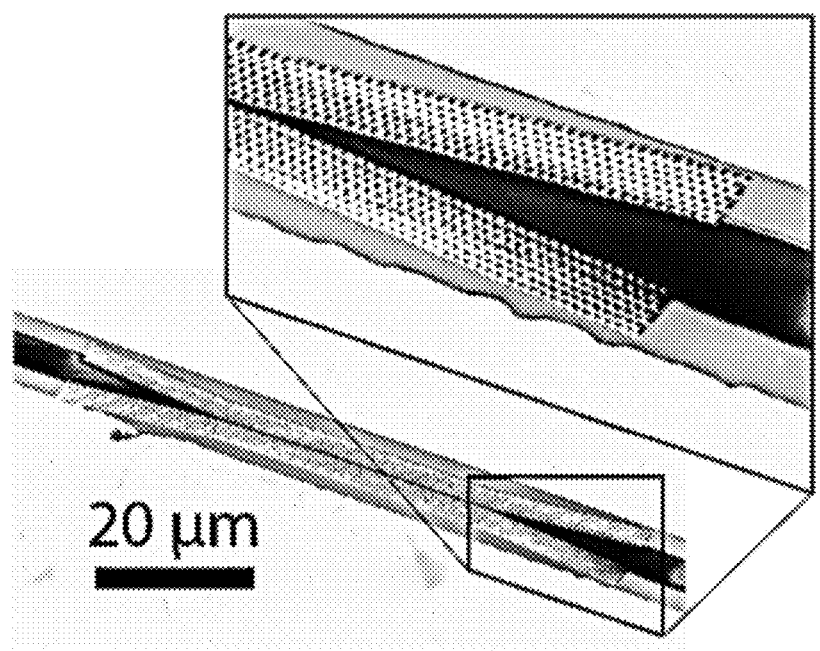
Figure 1E:
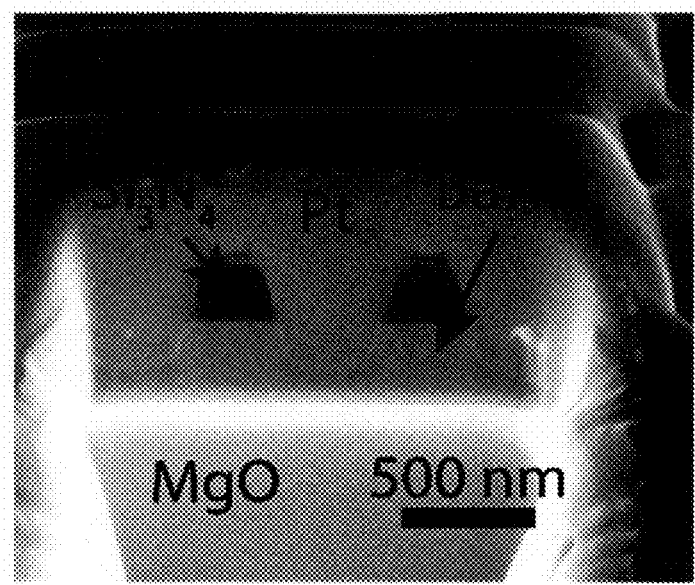

A schematic representation of the slow-light traveling-wave modulator is shown in FIG. 1A. The PC waveguide can have a hexagonal array of holes in the electro-optic medium with a single line of holes removed in the direction of light propagation, commonly referred to as a W1 structure. The waveguide was designed to have a low dispersion region in its optical group index by shifting the first row of holes adjacent to the line defect by 0.124a, where a is the lattice constant of the photonic crystal. The calculated band structure (FIG. 1B) shows a single line defect mode within the gap region. The corresponding group index of this mode (FIG. 1C), calculated as $n_g = c/(d\omega/dk)$, where c is the speed of light in free space, ω is the angular frequency, and k is the wavenumber, is 9.1±0.9 within a 9.4 nm range centered at 1526 nm for a lattice constant of 530 nm. The W1 structure was patterned via focused ion beam lithography onto a $Si_3N_4/BaTiO_3$ ridge waveguide such that the PC occupies a portion of the total interaction length (FIG. 1D). A compromise between scattering losses and electro-optic coefficient enhancement was obtained by patterning a 37 micron long PC region that penetrates 250 nm of the 500 nm thick $BaTiO_3$ film. The cross-sectional profile of the fabricated holes shows a conical profile (FIG. 1E).

The performance of the PC modulator was evaluated at modulation frequencies between 10 and 40 GHz and at wavelengths in the optical C band (1500-1580 nm) using optical spectral analysis, a technique for measuring electrooptic device properties in the 10 GHz to 1 THz frequency region. The measured optical spectra for modulation frequencies between 10 and 40 GHz are plotted in FIG. 2A. The data is plotted as intensity versus frequency displacement ($\Delta f$) from the center laser wavelength ($\lambda_c$). The frequency displacement is calculated as $\Delta f=(c/\lambda^2)(\Delta\lambda)$, where c is the speed of light in free space, $\lambda$ is the optical wavelength, and $\Delta\lambda=|\lambda-\lambda_c|$. The peak positions are in excellent agreement with the modulation frequency, indicating that they are due to the electro-optic sideband response.

The sideband peak intensities decrease with increasing modulation frequency due primarily to microwave losses associated with the electrodes. The dependence of the electro-optic frequency response on the microwave losses was investigated independently through both electro-optic frequency response measurements with a calibrated vector network analyzer setup and electro-optic response modeling using microwave properties obtained from S-parameter measurements. (Details on both measurement techniques are given in the following examples.) The measured and modeled electro-optic frequency responses are shown in FIG. 2B. The traveling-wave device has a measured 3 dB EO bandwidth of 4.5 GHz with a measured response out to 40 GHz. The response was modeled using the approach of Rahman and Haxha, which includes traveling-wave losses associated with microwave and optical index mismatch, impedance mismatch of the electrodes to the 50 Ω measurement system, and microwave conductor and dielectric absorptive losses. (See, S. Haxha, B. Rahman, and K. T. Grattan, "Bandwidth estimation for ultra-high-speed lithium niobate modulators," Appl. Opt. 42, 2674-2682 (2003).) The frequency-dependent microwave index, characteristic impedance, and attenuation losses calculated from measured electrical S-parameters were included in the model. Comparing the measured and modeled EO response, the model predicts a lower response at lower frequencies and a slightly higher response at higher frequencies than what is measured. This is attributed to a frequency dependence of the electro-optic coefficient, which is not included in the model.

The EO frequency response of the modulator can be much improved by tailoring the properties of the $BaTiO_3$ PC waveguide and coplanar stripline electrodes. For a $\chi^{(2)}$ PC modulator, the voltage-length product according to an extension of the model proposed by Soljacic et al. is $$V_\pi \cdot L = \frac{\lambda_0 g}{n^2 n_{g,R} f_{eo} r_{eff} \Gamma} \quad (1)$$

where $\lambda_0$ is the free space wavelength, g is the electrode gap spacing, $r_{eff}$ is the effective electro-optic coefficient, $\Gamma$ is the electro-optic overlap factor, n is the waveguide mode index, $n_{g,R}$ is the group index of the ridge waveguide, and $f_{eo}$ is the electro-optic enhancement factor given by $$f_{eo}=(1-x)+x(n_{g,P}/n_{g,R}) \quad (2)$$

where $x \equiv L_p/L$ is the fractional filling of the interaction region of total length L with a PC of length $L_P$, and $n_{g,P}$ is the group index of the PC. (See, M. Soljačić, S. G. Johnson, S. Fan, M. Ibanescu, E. Ippen, and J. Joannopoulos, "Photonic-crystal slow-light enhancement of nonlinear phase sensitivity," *JOSA B* 19, 2052-2059 (2002).) (Details of the derivation of Eqn. 1 and 2 are given in the examples.) The importance of these equations result is the following: an increase in the group index of the PC enables a reduction in the required device length for a $\pi$ phase shift. Since the microwave losses are length dependent, a smaller footprint enables an increase in the electro-optic bandwidth. To demonstrate, consider a PC device with total length of 100 μm and group index of 20. Using the measured microwave properties of the device reported here and the model of Rahman and Haxha gives the response of the green dash-dot curve in FIG. 2B, showing an 18 GHz 3 dB bandwidth. Optimizing the electrode impedance to 50 Ω in the 20-50 GHz region gives the response of the purple dotted curve, which has a 35 GHz 3 dB bandwidth. Both of these devices have a half-wave voltage of 16 V and voltage-length product of 0.16 V-cm for operation at 1550 nm with the same geometry as the device reported here. The half-wave voltage can potentially be reduced to as small as 1.4 V for the 100 μm device by improving the material quality to achieve an effective electro-optic coefficient equal to that of the bulk material (850 pm/V) under high-frequency clamped conditions. (Additional details on the simulated device performance are given in the examples.)

Figure 2A:
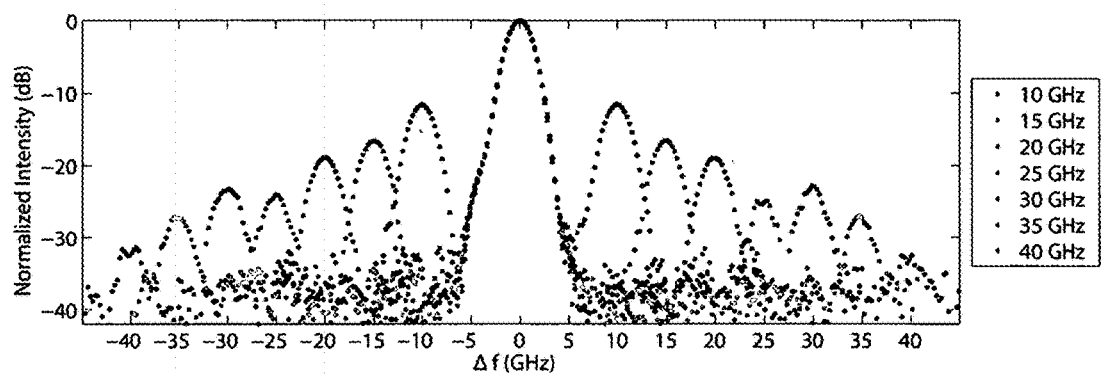
Figure 2B:
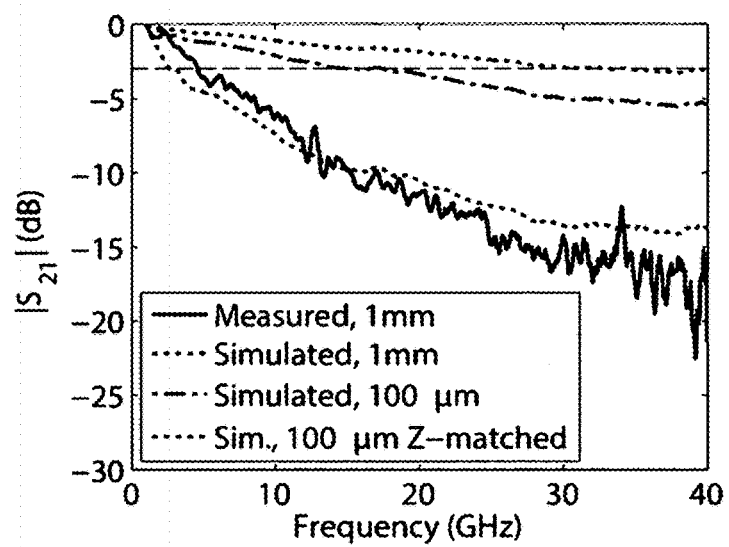
Figure 2C:
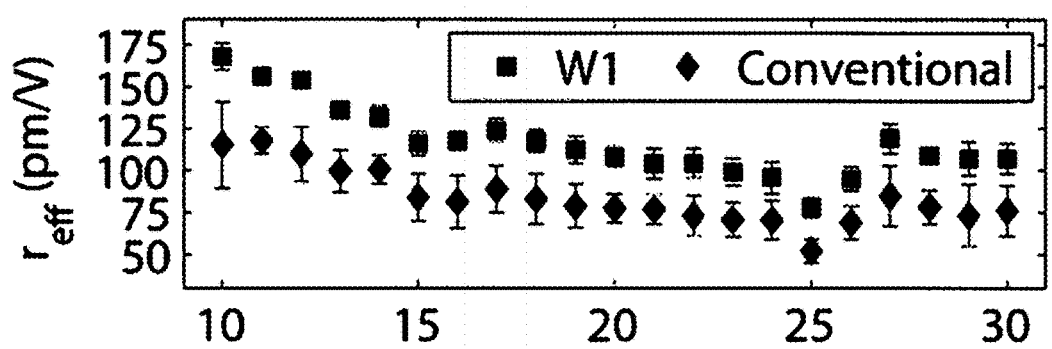

Using the measured EO sideband response shown in FIG. 2A and the modeled EO frequency response shown in FIG. 2B, it is possible to calculate the frequency-dependent effective electro-optic coefficient at modulation frequencies above 10 GHz. This approach is especially powerful for investigating the properties of electro-optic devices at technologically relevant modulation frequencies. It can also be applied to other modulation mechanisms and materials, including free-carrier depletion-mode silicon modulators. (Details of the calculations are given in the examples.) In brief, the $n^{th}$ order sideband peak intensity is proportional to $J_n^2(\delta)$, where $J_n$ is the Bessel function of the first kind of order n and $\delta$ is the phase modulation index given by $$\delta = \frac{\omega_0 n^3 r_{eff}}{2c} \Gamma E_m m(f) L \quad (3)$$

where $\omega_0$ is the modulation (angular) frequency, n is the optical mode index, $r_{eff}$ is the effective in-device electro-optic coefficient, c is the speed of light in free space, $\Gamma$ is the electro-optic overlap factor, $E_m$ is the applied microwave electric field, L is the device length, and m(f) is the electro-optic frequency response modeled from the measured electrical S-parameters. The effective EO coefficient is numerically calculated from Eqn. (3) for known values of the sideband peak intensity measured with respect to that of the central peak and known values for all the other parameters. (A sample calculation is given in the examples.) Using this approach, the effective electro-optic coefficient in the 10-30 GHz range was measured in a W1 modulator and a conventional modulator which are identical apart from the PC (FIG. 2C). The electro-optic coefficient generally decreases with frequency in the 10-30 GHz range with the sharpest decrease between 10 and 15 GHz. The observed trend of decreasing EO coefficient with frequency follows that of the measured dielectric constant of $BaTiO_3$ thin films. This is not unexpected given the direct relationship between the linear electro-optic coefficient and the dielectric constant tensor elements. For the measurements at 1530 nm with a 5 μm gap spacing, mode index (n) of 2.13, electro-optic overlap factor of 0.71, and electrode length of 1 mm, the voltage-length product for the PC modulator calculated from Eqn. 1 is 0.66 V-cm and 1.0 V-cm at 10 and 30 GHz, respectively.

Figure 2D:
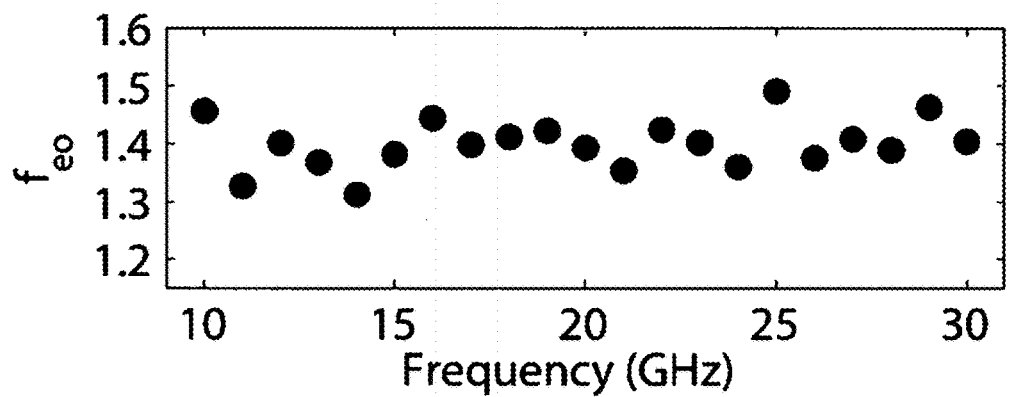

A clear enhancement of the effective EO coefficient is observed across the entire frequency range with a calculated enhancement factor between 1.3 and 1.5 (FIG. 2D). The enhancement is well beyond the measurement uncertainty, given by the error bars in FIG. 2C. Using Eqn. 3 with the average measured PC group index of 16.3 (the measurement is discussed below) and ridge waveguide group index of 2.13, the expected enhancement factor is 1.25. The measured enhancement of 1.4 is slightly larger than this value, which is tentatively attributed to uncertainty in the group index measurement and the effect of the tapered region on the slow light properties. The enhancement of the electro-optic coefficient in only the PC region is $f_{eo,loc}=n_{g,P}/n_{g,R}$ [32], which according to Eqn. (3) gives $$f_{eo,local} = \frac{n_{g,P}}{n_{g,R}} = \frac{f_{eo} - (1-x)}{x}$$

Using the measured average enhancement factor of 1.4 and x=0.037 corresponding to a 37 μm long PC in a 1 mm long device, the local enhancement factor is 12. For an intrinsic electro-optic coefficient of 76 pm/V at 30 GHz, the corresponding locally enhanced electro-optic coefficient in the PC region is 900 pm/V—the first demonstration of slow light enhancement of the electro-optic coefficient in a ferroelectric $\chi^{(2)}$ waveguide at microwave frequencies.

The optical sideband response was additionally characterized as a function of applied voltage with all other parameters fixed. The voltage-dependent spectra at a modulation voltage of 10 GHz and optical carrier wavelength of 1530 nm are shown for the PC modulator in FIG. 3A. The sideband peak intensity increases with applied voltage, which is due to an increase in electro-optic phase delay. The phase delay, given by Eqn. (2), was calculated by taking the ratio of the measured central peak to first order sideband peak intensities and solving numerically for the argument of the Bessel function. (See, Y. Shi, L. Yan, and A. E. Willner, "High-Speed Electrooptic Modulator Characterization Using Optical Spectrum Analysis," *J. Lightwave Technol.* 21, 2358 (2003); and A. Yariv and P. Yeh, *Optical Waves in Crystals* (Wiley, N. Y., 1984), Vol. 10.) The phase delay calculated using this approach is plotted in FIG. 3B for both the PC and conventional modulators. An enhancement in agreement with that calculated for the electro-optic coefficient is observed across the entire voltage range. Both modulators show a nonlinear dependence of the phase delay on applied voltage. This difference is attributed to the large off-diagonal electro-optic tensor elements $r_{51}=r_{42}$ of the single crystal $BaTiO_3$ film, which adds a quadratic dependence to the voltage-dependent phase delay. The measured phase delay is lower than expected given the electro-optic coefficients calculated in FIG. 2C. This is due to the significant attenuation of the microwave field at a modulation frequency of 10 GHz. This can be reduced by either further shortening the electrodes or impedance matching, as previously discussed.

The electro-optic device properties were further characterized versus wavelength in the optical C band. The measured waveguide transmission is shown in FIG. 4A. The transmission starts to decrease at 1530 nm, indicating the onset of a PC band edge, as predicted by simulation (FIG. 1). Clear fringes were measured in the transmission across the entire measurement range. Oscillations with the same fringe spacing were not measured in ridge waveguides on the same wafer, indicating that the fringes are due to Fabry-Perot reflections within the PC cavity. The optical group index (FIG. 4B) was calculated from the fringes as $n_g=\lambda_c^2/(2l_c\Delta\lambda)$, where $\lambda_c$ is the center wavelength between fringes, $l_c$ is the PC cavity length taken as the length of the W1 segment, and $\Delta\lambda$ is the fringe spacing. The measured group index is between 15 and 18, which is larger than that predicted by simulation. This is attributed to the 2D symmetry of the simulation. It is additionally noted that the group index is nearly flat across the measurement region instead of increasing significantly near the band edge. This is possibly due to coupling of light from the PC line defect mode to the ridge waveguide mode.

Using the spectral analysis technique, the electro-optic coefficient of the W1 modulator was measured versus wavelength at a modulation frequency of 10 GHz. The electro-optic coefficient has a value of 123 pm/V at 1530 nm and decreases to a value of 111 pm/V at 1560 nm. The reduction in the electro-optic coefficient across the band edge is attributed to coupling of optical power from the line defect mode to the ridge waveguide mode at wavelengths closer to the forbidden region. It is expected that, for a waveguide with only a line defect mode, the electro-optic coefficient would increase toward the band edge due to the increase in group index. Regardless of this effect, wideband slow light enhancement by a factor of 1.3 is measured in a 48 nm window centered about 1524 nm. This demonstrates the potential use of $\chi^{(2)}$ PC modulators with wideband enhancement for wavelength division multiplexing schemes.

As demonstrated above, the present invention provides an integrated $\chi^{(2)}$ electro-optic modulator with wide optical bandwidth operation at modulation frequencies up to 40 GHz. Slow light EO enhancement is observed over optical wavelengths in the optical C band and at technologically relevant modulation frequencies from 10 to 30 GHz. An EO enhancement factor of 1.4 and an EO coefficient of 107 pm/V at 30 GHz was obtained for a 1 mm long device. A locally enhanced electro-optic coefficient of 900 pm/V was obtained in the photonic crystal region. By exploiting size reduction enabled by the slow light enhancement and impedance matching the electrodes to 50 Ω, devices with electro-optic bandwidths of 40 GHz and voltage-length product of 0.16 V-cm are predicted in devices with a total length of 100 μm. By continuing to improve the quality of the epitaxial films, the voltage-length product can be potentially reduced to 0.014 V-cm and the device voltage reduced to 1.4 V for a 100 μm long PC device.

As can relate to various other embodiments of this invention, electro-optic phase modulators based on a barium titanate platform, can be used as building blocks for coherent optical data transceivers. As discussed above, to further lower the operating voltage and increase the bandwidth of barium titanate, demonstrated electro-optic phase modulators were integrated with two-dimensional photonic crystals (PCs). A device operated at 17 GHz with driving voltage at 5 V was demonstrated. Its length is 3 mm, one tenth the length of a $LiNbO_3$ modulator. By decreasing device length to 1.5 mm, devices with 50 GHz bandwidth can be demonstrated. Furthermore, the effective EO coefficient was enhanced through slow light effect in a $BaTiO_3$ phase modulator with a PC band structure. The slow light effect enhances the effective EO coefficient and reduces the driving voltage for operation. The PC microwave properties have been measured from 10-45 GHz. An increase of the effective EO coefficient from 60 to about 110 pm/V across the band edge is obtained, resulting in an enhancement factor up to 1.8. The $BaTiO_3$ PC modulator can contribute to the deployment of next-generation networks through tenfold reduction in device footprint over its $LiNbO_3$ counterparts.

Because of the increasing demands in data communications bandwidths, ongoing efforts have been directed to ways to reduce the sizes and costs of optical devices. One significant way for which the sizes and costs of optical devices can be reduced is through the use of photonic integrated circuits (PICs), which allows many optical components to be fabricated on a single wafer. As can be used in conjunction with the design and fabrication of a coherent optical transmitter, high epitaxial quality barium titanate thin films were grown on Si by a two-step growth strategy well-known to those skilled in the art. Barium titanate growth is nearly two dimensional with a smooth surface and dense atomic steps. Reflection high-energy electron diffraction (RHEED) indicates that barium titanate/SrTiO$_3$ interface is coherent up to 4 nm; the interfacial strain is dominated by the compressive lattice mismatch strain, which is fully relaxed up to 30-40 nm; using thin SrTiO$_3$ as a buffer layer reduces the effective lattice and thermal mismatches between barium titanate and Si. (See, e.g., F. Niu and B. W. Wessels, "Epitaxial growth and strain relaxation of BaTiO$_3$ thin films on SrTiO$_3$ buffered (001) Si by molecular beam epitaxy", J. Vac. Sci. Technol. B 25, 1053-1057 (2007), which is incorporated herein by reference in its entirety).

As can relate to certain such embodiments, Mach-Zehnder (MZ) optical modulators can utilize the present electro-optic phase modulators and the silicon nitride technology for polarization-division multiplexing-Quadrature phase-shift keying (PDM-QPSK) and next generation optical communications applications. Coherent optical communication systems utilize the transmission of phase information instead of amplitude modulation. Coherent optical transmission has become a key technology for long haul 100+Gb/s and beyond. The present invention can be directed to monolithic BaTiO$_3$ photonic integrated circuits for compact, low energy 100+Gb/s coherent optical transmitters. Each of one or more MZ optical modulators can comprise of two Y-junction waveguides and two straight waveguides (see, e.g., FIG. 16). Individual Y-junctions located besides the MZ modulators will be used for reference of scattering loss measurement. The branching angle (5.3°) of the Y-junction was chosen so that there is negligible scattering loss. The length of the total MZ is between 4-5 mm for an active region of 1-2 mm. The polarization rotator is based on adiabatic mode evolution by the broken horizontal and vertical symmetry in the waveguide cross section through a tapered Si$_3$N$_4$ waveguide on top of a barium titanate layer. The polarization beam combiner can be fabricated with a Si$_3$N$_4$ waveguide directional coupler. The π/2 phase shifters are two phase elements outside the MZs, and can be made with barium titanate electro-optic modulators with broadband operation at multiple wavelengths.

As can relate to certain other embodiments, the phase modulators of this invention can be applied as building blocks for higher throughput data transmission based on a QAM-16 scheme. In order to increase the bit rates in optical fiber systems, Quadrature amplitude modulation can be used. The present phase modulators are readily suitable for the QAM-16 applications.

EXAMPLES OF THE INVENTION

Example 1

Design of the BaTiO$_3$ W1 Waveguide. The PC waveguide was designed using the open source software MIT photonic bands (MPB). Two dimensional plane wave expansion (PWE) simulations were done to calculate the band structure, from which the group index was calculated. The mode index (2.13) of the ridge waveguide mode, calculated using a finite difference time domain mode solver (A. B. Fallahkhair, K. S. Li, and T. E. Murphy, "Vector finite difference modesolver for anisotropic dielectric waveguides," J. Lightwave Technol. 26, 1423-1431 (2008)), was used as the index of the high dielectric constant region. It is noted that the simulation is not truly representative of the fabricated device since the device lacks out-of-plane symmetry; the calculations, however, are sufficient for determining the correct lattice constant for operation in the optical C band.

Example 2

Fabrication. BaTiO$_3$ films were epitaxially grown on (100) MgO substrates using a two-stage nucleation and growth metal-organic chemical vapor deposition technique. Details of this technique are reported in U.S. Pat. No. 7,224,878, the entirety of which is incorporated herein by reference. The film has an as-grown surface roughness<1.3 nm and 0.47° rocking curve width of the (200) peak. After growth, the film was subsequently annealed in an oxygen environment at 4 Torr total pressure and 900° C. for 45 minutes. Silicon nitride ridge waveguides and gold coplanar electrodes were fabricated using standard UV lithographic techniques. The dimensions of representative, non-limiting ridge waveguide and electrodes are given in FIG. 10. Immediately following waveguide fabrication and prior to fabrication of the gold electrodes, the wafer was annealed a second time in oxygen at 4 Torr total pressure at 350° C. for 30 minutes. Following the UV lithography steps, the photonic crystal was fabricated using direct write ion beam lithography using an FEI Nova 600 NanoLab DualBeam focused ion beam with Elphy Raith lithographic software and hardware at the Center for Nanoscale Materials at Argonne National Laboratory. A total ion beam dose of 4 mC/cm$^2$ and ion beam current of 0.46 nA were used. The line defect waveguide consists of a 37 μm long straight segment between two 20.5 μm long tapered regions. Each tapered region consists of 40 rows of holes with an outward shift of 0.25a per row, where a is the lattice constant, 530 nm.

Example 3

Optical Spectral Analysis Characterization. The optical spectral analysis technique reported by Shi et al. for phase modulators was used to investigate the electro-optic properties at frequencies above 10 GHz. (See, Y. Shi, L. Yan, and A. E. Willner, "High-Speed Electrooptic Modulator Characterization Using Optical Spectrum Analysis," J. Lightwave Technol. 21, 2358 (2003).) Light from a tunable laser source (HP 8164A) was TE polarized in the in-plane direction of the BaTiO$_3$ film and coupled into and out of the PC waveguide using tapered lensed fibers (Nanonics SMF-28). An analog signal generator (Agilent E8257D) was used to produce a sinusoidal modulation signal, which was amplified to a saturated output of +23 dBm (Centellax OA4MVM). The actual output voltage was found to vary with both frequency and input power and was measured using a vector network analyzer. A dc bias voltage up to 10 V was added to the signal using a high frequency bias tee (PulseLabs 5541A), and the signal was applied to the 50 Ω terminated modulator using high-speed wafer probes (Cascade Microtech ACP50 SG and GS 100). The modulated light collected at the device output was coupled via fiber into an optical spectral analyzer (Yenista OSA20) with 6 GHz resolution bandwidth and greater than 55 dB optical rejection ratio for measuring the electro-optically phase modulated sideband response. A schematic of the measurement setup and full details on the measurement method are given below.

Example 4

Electro-optic Coefficient Enhancement in $\chi^{(2)}$ Waveguides. The phase delay in a waveguide with high group index is, in the most general sense, given by $$\delta\phi = \frac{2\pi L}{\lambda_0}\Gamma\frac{\delta n}{n}n_g. \tag{1}$$

where $\delta\phi$ is the total phase delay, L is the interaction length, $\lambda_0$ is the optical wavelength, n is the optical index, $\delta n$ is the modulation of the refractive index, and $\Gamma$ is the fraction of optical power confined in the region which experiences a refractive index change $\delta n$ due to an applied external stimulus. (See, M. Soljačić', S. G. Johnson, S. Fan, M. Ibanescu, E. Ippen, and J. Joannopoulos, Photonic-crystal slow-light enhancement of nonlinear phase sensitivity," *JOSA B* 19, 2052-2059 (2002).) For the case of an electro-optic material where the applied stimulus is an electric field, the refractive index change is given by $$\delta n = \frac{1}{2}n^3 r_{eff}\frac{V}{g} \tag{2}$$

where $r_{eff}$ is the effective electro-optic coefficient representing the overall contribution from the electro-optic tensor elements, and V is the applied voltage across a gap spacing g. Substituting (2) into (1) gives the general relation for phase shift in a $\chi^{(2)}$ waveguide due to the electro-optic effect:

$$\delta\phi = \frac{\pi L}{\lambda_0}\Gamma n^2 n_g r_{eff}\frac{V}{g} \tag{3}$$

Consider the reduction in voltage-length product and enhancement of the electro-optic coefficient in $\chi^{(2)}$ nonlinear waveguides. The approach is generalized for a photonic crystal modulator having a total interaction length L within which a photonic crystal of length $L_p$ is placed. The length of the interaction region without the photonic crystal is $L_R = L - L_P$. The total phase delay in the ridge waveguide region without the photonic crystal is $$\delta\phi_R = \frac{\pi L_R}{\lambda_0}\Gamma n^2 n_{g,R} r_{eff}\frac{V}{g} \tag{4}$$

where $n_{g,R}$ is the group index of the ridge waveguide. The phase delay in the photonic crystal segment is given similarly by $$\delta\phi_P = \frac{\pi L_P}{\lambda_0}\Gamma n^2 n_{g,P} r_{eff}\frac{V}{g} \tag{5}$$

The total phase delay $\delta\phi_T$ in the composite ridge and photonic crystal waveguide is then $$\delta\phi_T = \delta\phi_R + \delta\phi_P = \frac{\pi}{\lambda_0}\Gamma n^2 r_{eff}\frac{V}{g}(n_{g,R}L_R + n_{g,P}L_P) \tag{6}$$

Using the result given in Eqn. (6), the half-wave voltage of the composite waveguide modulator is obtained by setting $\delta\phi_T = \pi$ and solving for the voltage:

$$V_\pi = \frac{\lambda_0 g}{n^2 r_{eff}\Gamma L}[(1-x)n_{g,R} + xn_{g,P}]^{-1} \tag{7}$$

Solving for the voltage length product $V_\pi \cdot L$ gives $$V_\pi \cdot L = \frac{\lambda_0 g}{n^2 n_{g,R} r_{eff}\Gamma}[(1-x) + x(n_{g,P}/n_{g,R})]^{-1}. \tag{11}$$

For the case of a conventional modulator where $L_P = 0$, the voltage-length product reduces to $$V_\pi \cdot L = \frac{\lambda_0 g}{n^2 n_{g,R} r_{eff}\Gamma}. \tag{9}$$

Comparing Eqn. (8) and (9), the effective electro-optic coefficient is enhanced in the composite waveguide modulator by the factor $$f_{eo} = (1-x) + x(n_{g,P}/n_{g,R}) \tag{10}$$

The voltage-length product of a photonic crystal modulator can hence be written generally as $$V_\pi \cdot L = \frac{\lambda_0 g}{n^2 n_{g,R} f_{eo} r_{eff}\Gamma}. \tag{11}$$

Example 5

Measurement of the High Frequency Electro-Optic Coefficient via Optical Spectral Analysis. The theoretical relation between measured phase-modulated sideband response and the effective electro-optic coefficient is elucidated. First, the theoretical sideband response is derived, followed by a graphical relation between the relative sideband peak height and electro-optic coefficient.

For $\chi^{(2)}$ materials, the electro-optic phase delay for linearly polarized light is $$\Delta\phi_x = \frac{\omega_o n_x^3 r_{eff}}{2c}\Gamma E_m L \tag{12}$$

where $\omega_0$ is the optical frequency, $n_x$ is the mode refractive index for light polarized in the x direction, $r_{eff}$ is the effective electro-optic coefficient of the polydomain film, $E_m$ is the applied microwave electric field magnitude, and L is the interaction length or the length of the electrodes. The applied electric field is assumed to be sinusoidal such that $$E_m(t) = A_{mw} m(f) \cos \omega_m t \quad (13)$$

where $A_{mw}$ is the driving amplitude and m(f) is the electro-optic frequency response measured independently. The phase-modulated optical field is given by $$E_o(t) = A_o \exp[-j(\omega_o t + \Delta\phi(t)] \quad (14)$$

where $\omega_o$ is the center frequency of the laser light and is kept constant throughout a single measurement. Substituting in $\Delta\phi_x$ from Eqn. (12) and $E_m(t)$ from (13)

$$E_o(t) = A_o \exp(-j\omega_o t) \exp\left[-j \frac{\omega_o n^3 r_{\mathit{eff}}}{2c} \Gamma L A_{mw} m(f) \cos \omega_m t\right] \quad (15)$$

We define the modulation index z as $$z \equiv \frac{\omega_0 n_x^3 r_{\mathit{eff}}}{2c} \Gamma A_{mw} m(f) L \quad (16)$$

Using the Bessel-function identity $$e^{jz\cos\theta} = \sum_{n=-\infty}^{\infty} j^n J_n(z) e^{jn\theta} \quad (17)$$

the optical field is expressed as $$E_o(t) = A_o \exp(-j\omega_o t) \sum_{n=-\infty}^{\infty} j^n J_n(z) e^{jn\omega_m t} \quad (18)$$

The spectral content of the electric field is obtained by taking the Fourier transform of Eqn. (18), the final result of which is:

$$E_o(\omega) = \frac{1}{\sqrt{2}} A_o \sum_{n=-\infty}^{\infty} j^n J_n(z) \delta(\omega_o - \omega - n\omega_m) \quad (19)$$

The intensity $I(\omega)$ is then $$I(\omega) = E_0^* E_0 = \frac{A_o^2}{\sqrt{2\pi}} \sum_{n=-\infty}^{\infty} J_n^2(z) \delta(\omega_o - \omega - n\omega_m) \quad (20)$$

The intensity $I(\omega)$ is the signal measured by the optical spectrum analyzer. It is noted that this result is specific to the case of a phase modulator. The theoretical response is a series of peaks distributed equidistantly on either side of the center laser frequency $\omega_o$ with separation distance equal to an $n^{th}$ order of modulation frequency. The intensity of the $n^{th}$ order peak is given by $J_n(z)^2$, which is a function of the effective in-device electro-optic coefficient, $r_{\mathit{eff}}$. Hence from a given measured spectrum the electro-optic coefficient can be calculated from the difference (in dB) of the measured peak heights.

Example 6

The electro-optic phase modulated sideband response was measured using the experimental setup in FIG. 5. Light from the tunable laser source (HP 8164A) was TE polarized in the plane of the $BaTiO_3$ film and coupled into and out of the PC waveguide using tapered lensed fibers (Nanonics SMF-28). An analog signal generator (Agilent E8257D) was used to produce a sinusoidal modulation signal, which was amplified to a saturated output of +23 dBm (Centellax OA4MVM). The voltage supplied by the amplified output was measured versus frequency for different input powers used in this study using a calibrated vector network analyzer (VNA) with a 30 dB attenuator placed between the amplifier output and VNA port. The power dependent frequency response of the amplifier is shown in FIG. 6 (in order: 0 dBm, top to 20 dBm, bottom). The measured power dependent response was used to accurately determine the applied voltage for calculating the electro-optic coefficient. A dc bias voltage up to 10 V was added to the microwave signal using a high frequency bias tee (PulseLabs 5541A), and the signal was applied to the 50 terminated modulator using high-speed wafer probes (Cascade Microtech ACP50 SG and GS 100). The modulated light collected at the device output was coupled via fiber into an optical spectral analyzer (Yenista OSA20) with 6 GHz resolution bandwidth and greater than 55 dB optical rejection ratio for measuring the electro-optically phase modulated sideband response.

Example 7

Consider a sample calculation to demonstrate the procedure for obtaining the effective in-device electro-optic coefficient from the measured sideband response. The modulator discussed above has a 5 wide gap spacing and has a calculated overlap factor $\Gamma = 0.71$. The optical mode index was calculated using an open-source finite difference mode solver to be 2.13. (A. B. Fallahkhair, K. S. Li, and T. E. Murphy, "Vector finite difference modesolver for anisotropic dielectric waveguides," *Journal of Lightwave Technology* 26, 1423-1431 (2008).) The measured optical sideband response at 10 GHz modulation and an optical wavelength of 1530 nm is shown in FIG. 7A. For 0 dBm input power and 10 GHz modulation frequency, the driving voltage obtained from FIG. 6 is 5.3 $V_{pp}$. The measured electro-optic magnitude response of the device at 10 GHz is 0.433 (obtained from FIG. 2B). The difference in intensity between the zeroth and first order peaks for the measurement conditions is plotted versus electro-optic coefficient in FIG. 7B. Shown as a horizontal line is the measured difference in peak height, equal to 11.55 dB. The line and curve intersect at an electro-optic coefficient of 161 pm/V.

Example 8

Electro-Optic Frequency Response Measurements. The frequency dependent electro-optic response was measured using a vector network analyzer in the measurement schematic shown in FIG. 8. Electrical lines are colored green and optical paths are colored blue in the schematic. In order to maximize the signal to noise ratio, the intermediate frequency bandwidth of the vector network analyzer (VNA) was set to 10 Hz. The output power of the VNA was set to −15 dBm and was amplified to a nominal output power of 12 dBm. The measurement was done while biasing the device at 5 V and terminating the electrodes in a 50 load. Light was coupled into and out of the modulator with tapered fibers (Nanonics). The input light was polarized at 45 with respect to the out-of-plane direction in order to couple into both TE and TM fundamental modes. An inline polarizer was used to convert the phase modulated light to an intensity modulated signal after coupling light out of the device. The intensity modulated light was collected and converted back to the electrical domain using a high speed photodiode (U2T), the output of which was connected to port 2 of the VNA. The measurements were done after calibrating the measurement system at points corresponding to the input of the amplifier at port 1 and the output of the photodiode at port 2. The effects of the amplifier, bias tee, and photo-diode on the measurement were removed post-measurement by subtracting the measured frequency response of these components from the measured electro-optic response.

Example 9

S-Parameter Measurements. The microwave properties of the photonic crystal modulator were obtained from scattering-parameter (S-parameter) measurements. The full two-port scattering parameters, including magnitude and phase, were measured over the frequency range of 10 MHz to 50 GHz using an Agilent N5230C PNA-L vector network analyzer. The measurements were done with cables rated for operation up to 50 GHz with 2.4 mm connectors. Prior to measurements, the system was calibrated at the high speed probe tips via a short-open-load-thru calibration using an alumina impedance standard substrate. The measurements were taken with an intermediate frequency bandwidth of 35 kHz and with an averaging factor of 50.

Example 10

The measured magnitude and phase of the transmission coefficient, $S_{21}$, and magnitude of the reflection coefficient, $S_{11}$ are shown in FIG. 9. The $S_{21}$ magnitude response decreases toward higher frequencies due to increasing frequency-dependent microwave losses. The phase of the transmission increases nearly linear with frequency in the 10 to 50 GHz region. The magnitude of the reflection coefficient increases quickly with frequency in the low-frequency region and is fairly flat out to 50 GHz.

Example 11

The effective microwave index and characteristic impedance were calculated from the S-parameter measurements in order to simulate the electro-optic frequency response. The microwave index was calculated from the measured $S_{21}$ phase delay, $\arg\{S_{21}\}$, as $$n_{mw} = \arg\{S_{21}\}\frac{c}{2\pi f L} \quad (21)$$

where c is the speed of light in free space, f is the microwave frequency, and L is the electrode length. Using the calculated microwave index and the known geometry of the device, the impedance (Z) was calculated as in E. Chen and S. Y. Chou, "Characteristics of coplanar transmission lines on multilayer substrates: Modeling and experiments," *IEEE transactions on microwave theory and techniques* 45, 939-945 (1997):

$$Z = \frac{120\pi}{n_{mw}} \frac{K(k')}{K(k)} \quad (22)$$

where K is the elliptic integral of the first kind with arguments $$k = \sqrt{1 - \left(\frac{g}{2w+g}\right)^2}$$

$$k' = \sqrt{1 - k^2}$$

where g and w are the electrode gap spacing and width as defined in FIG. 10. The total microwave attenuation loss was calculated from the measured S-parameters as $$\alpha = \frac{4.343}{L}\ln\left(\frac{1 - S_{11}^2}{S_{21}^2}\right)[dB/cm] \quad (23)$$

Example 12

The frequency dependent index, impedance, and total microwave attenuation loss are shown in FIG. 11. The data plotted in this figure were used for the modeled curves in FIG. 2B and for calculating the predicted electro-optic bandwidth for short photonic crystal devices.

Example 13

Device Modeling. The electro-optic frequency response of photonic crystal electro-optic modulators was modeled using the following electro-optic magnitude response model:

$$m(f) = \left|\frac{1 - S_1 S_2}{(1+S_2)[\exp(j2u_+) - S_1 S_2 \exp(-j2u_-)]} \times \left[\exp(ju_+)\frac{\sin u_+}{u_+} + S_2\exp(-ju_-)\frac{\sin u_-}{u_-}\right]\right| \quad (24)$$

where $u_\pm$, $S_1$, and $S_2$ are defined as $$u_\pm \equiv \frac{1}{c}\pi f L(n_{mw} \mp n_o) - j\frac{1}{2}\alpha L \quad (25)$$

$$S_1 \equiv \frac{Z_1 - Z}{Z_1 + Z} \quad S_2 \equiv \frac{Z_2 - Z}{Z_2 + Z} \quad (26)$$

where c is the speed of light in free space (cm/s), f is the frequency (GHz), L is the electrode length (cm), $n_{mw}$ is the microwave index, $n_o$ is the optical mode index, a is the total microwave loss per unit length (dB/cm), and Z is the characteristic impedance. (See, S. Haxha, B. Rahman, and K. T. Grattan, "Bandwidth estimation for ultra-high-speed lithium niobate modulators," *Applied Optics* 42, 2674-2682 (2003).) The measured frequency-dependent microwave index, characteristic impedance, and total attenuation loss plotted in FIG. 11 were used in the model.

Example 14

The 3 dB EO bandwidth was calculated as the frequency at which the response modeled by Eqn. (24) falls below −3 dB. The 3 dB EO bandwidth was investigated versus optical group index of the PC waveguide for devices with total lengths of 100, 150, and 200. The calculations were done for the case where the impedance is given by the measured value plotted in FIG. 11 and when impedance matching is achieved in the 20-50 GHz region. The results are plotted in FIG. 12. Due to the lower length dependent losses, the EO bandwidth is larger for shorter devices. A significant increase in the EO bandwidth is predicted when the device is impedance matched to a 50 system. For example, for the case of the 100 long device, the bandwidth is expected to more than double when moderate optical group indices between 5 and 25 are used. The calculated bandwidths given in FIG. 12 are further discussed above.

Example 15

The voltage-length product was also calculated versus optical group index for the three different lengths using Eqn. (8). (See FIGS. 13A-B.) The calculations were done for the case where the interaction length is equal to the photonic crystal length, i.e. x=1. The voltage-length product was calculated at a wavelength of 1530 nm with g=5, $\Gamma$=0.71, n=$n_g^{wg}$=2.13 . The effective electro-optic coefficient used is that measured at 30 GHz for the conventional modulator, $r_{eff}$=75/ (see FIG. 2C above).

Examples 16-18 demonstrate $BaTiO_3$ modulators with high ER for high bit-rate operation in a single wavelength channel. Clear electro-optic modulation was measured out to a maximum modulation frequency of 50 GHz through a 25 km fiber with more than 8 dB ER. Since the modulation mechanism of these electro-optic devices is not restricted to a narrow wavelength range, these devices can be used in dense wavelength division multiplexing (DWDM) applications as well as at relevant wavelength windows at 850, 1310, and 1550 nm.

Example 16

Traveling-wave modulators with coplanar stripline electrodes were fabricated on $BaTiO_3$ thin films epitaxially grown on (100) MgO substrates. The electrodes have a gap spacing of 7.5 μm and length of 1 mm. The fabrication and epitaxial deposition details are provided above. The high frequency performance was evaluated by measuring the sideband phase modulation response using an optical spectrum analyzer. Measurements were done at 1550 nm wavelength with 10-50 GHz modulation frequency while applying a 15 V dc bias to the electrodes to pole ferroelectric domains.

Example 17

The frequency dependent phase modulated spectral response is shown for modulation frequencies between 10 and 50 GHz in FIG. 14. The data is plotted as intensity versus frequency displacement (Δf) from the center laser wavelength. Clear sideband peaks are detected for modulation frequencies up to 50 GHz. The decrease in the sideband response with increasing frequency is primarily due to microwave losses, which include both reflection and attenuation. The ER of the phase modulator was evaluated by comparing the sideband peak height to the noise floor in the measured spectrum. For all frequencies up to 50 GHz, a nominal ER of 8 dB or greater is measured for the 9.1 $V_{pp}$ driving voltage.

Example 18

The ER was also measured as a function of driving voltage to demonstrate low voltage operation. The voltage-dependent sideband response was measured at 10 and 25 GHz for driving peak-to-peak voltages between 2.2 and 9.1 $V_{pp}$ (FIG. 15A and 15B). At 10 GHz, the ER increases with modulation voltage up to a maximum value of 33.5 dB (FIG. 15C) at 7.1 $V_{pp}$, approximately the half-wave voltage of the device. A saturation in the extinction was not measured for a higher modulation frequency of 25 GHz due to attenuation of the applied voltage via device microwave losses. The measured extinction, however, is well above that reported for silicon devices at the similar modulation frequencies. Moreover, an extinction of more than 12 dB is measured at 25 GHz for 2.2 $V_{pp}$ operation (FIG. 15D), demonstrating the applicability of these devices for low voltage, high bandwidth operation.

As demonstrated, a clear electro-optic response was measured out to 50 GHz with a phase modulation ER of at least 8 dB across the entire frequency range for transmission through 25 km of fiber. An ER of more than 12 dB is measured at 25 GHz for a 2.2 $V_{pp}$ driving voltage. Note that the modulation mechanism of $\chi^{(2)}$ modulators, unlike Si and InP modulators, is wavelength agnostic over a wide spectral range, permitting its use at other technologically relevant wavelengths. By integrating such devices on the silicon platform, high frequency modulators with small footprint, high extinction, and low voltage for datacom applications can be envisioned.

We claim:

1. A modulator device comprising a photonic crystal waveguide, said waveguide comprising a substrate; a nano-dimensioned film component coupled to said substrate, said film component comprising $BaTiO_3$; and a single nanodimensioned ridge component coupled to said film component, said ridge component having a refractive index less than the refractive index of said film component, said film and ridge components comprising an electro-optic medium and an array of spaced lines of holes therein, said array defining an absent line of holes in the direction of light propogation through said medium and two tapered regions at opposite ends of said defined absent line, each said tapered region comprising lines of holes positionally shifted a constant nanometric distance from an adjacent line of holes, said array providing said waveguide a photonic crystal structure.

2. The device of claim 1 where said ridge component comprises $Si_3N_4$.

3. The device of claim 1 comprising two opposed, substantially coplanar electrodes, each said electrode on an opposed side of said ridge component.

4. The device of claim 1 comprising a hexagonal array of spaced lines of holes.

5. The device of claim 1 comprising a length dimension up to about 2 millimeters.

6. The device of claim 1 incorporated into a planar photonic integrated circuit.

7. A modulator device comprising a photonic crystal waveguide, said waveguide comprising a substrate; a nano-dimensioned film component on said substrate, said film component comprising $BaTiO_3$; a nanodimensioned $Si_3N_4$ ridge component on said film component; and two substantially coplanar electrodes, each said electrode on an opposite side of said ridge component, said film and ridge components comprising an electro-optic medium and an array of spaced lines of holes therein, said array defining an absent line of holes in the direction of light propogation through said medium and two tapered regions at opposite ends of said defined absent line, each said tapered region comprising lines of holes positionally shifted a constant nanometric distance from an adjacent line of holes, said array providing said waveguide a photonic crystal structure.

8. The device of claim 7 comprising a hexagonal array of spaced lines of holes.

9. The device of claim 7 comprising a length dimension up to about 2 millimeters.

10. The device of claim 7 incorporated into a planar photonic integrated circuit.

11. The device of claim 10 comprising a coherent optical transmitter.

12. The device of claim 7 capable of modulating light waves of wavelength of about 0.4 to about 5 microns.

13. The device of claim 7 capable of modulating TE and TM light modes suitable for optical coherent transmission systems.

\* \* \* \* \*